Ｕnited States Patent [19]

Aihara

[11] Patent Number: 5,856,849
[45] Date of Patent: Jan. 5, 1999

[54] DIGITAL PROCESSING OF VIDEO SIGNALS FOR PERFORMING ASPECT RATIO CONVERSION

[75] Inventor: Kenichi Aihara, Tokyo, Japan

[73] Assignee: Sony Corporation, Tokyo, Japan

[21] Appl. No.: 986,716

[22] Filed: Dec. 8, 1997

Related U.S. Application Data

[63] Continuation of PCT/JP97/01252 Apr. 10, 1997.

[30] Foreign Application Priority Data

Apr. 12, 1996 [JP] Japan .................................... 8-091593

[51] Int. Cl.$^6$ .................................................. H04N 7/01
[52] U.S. Cl. .......................... 348/445; 348/441; 348/333
[58] Field of Search .................................. 348/945, 441, 348/714, 716, 718, 556, 239, 333

[56] References Cited

U.S. PATENT DOCUMENTS

| | | | |
|---|---|---|---|
| 5,177,609 | 1/1993 | Kawakami et al. | 348/445 |
| 5,331,346 | 7/1994 | Shields et al. | 348/445 |
| 5,444,492 | 8/1995 | Kihara . | |
| 5,459,520 | 10/1995 | Sasaki | 348/445 |
| 5,655,356 | 8/1997 | Asaida et al. | 348/445 |
| 5,715,010 | 2/1998 | Izawa et al. | 348/445 |
| 5,719,633 | 2/1998 | Nishio et al. | 348/445 |

FOREIGN PATENT DOCUMENTS

| | | |
|---|---|---|
| 2-36673 | 2/1990 | Japan . |
| 5-244519 | 9/1993 | Japan . |
| 5-252538 | 9/1993 | Japan . |
| 7-30807 | 1/1995 | Japan . |
| 7-75070 | 3/1995 | Japan . |
| 7-250296 | 9/1995 | Japan . |

Primary Examiner—Victor R. Kostak
Attorney, Agent, or Firm—Frommer Lawrence & Haug, LLP; William S. Frommer

[57] ABSTRACT

Aspect ratio converting circuits store a digital signal at a first clock rate into a memory, wherein the digital signal represents a picture having a first aspect ratio. In the first mode, the digital signal is retrieved from the memory during one horizontal period on the basis of the first clock rate. In the second mode, in one horizontal period, a portion of the digital signal is retrieved on the basis of a second clock rate related to a conversion ratio between the first aspect ratio and a second aspect ratio of the picture.

16 Claims, 12 Drawing Sheets

DIGITAL PROCESSING OF VIDEO SIGNALS FOR PERFORMING ASPECT RATIO CONVERSION

This is a continuation of copending International Application PCT/JP97/01252 having an international filing date of 10 Apr. 1997.

BACKGROUND OF THE INVENTION

The present invention is related to digital signal processing of video signals and, in particular, a digital signal processing device and imaging apparatus for processing video signals whereby an aspect ratio of a picture is converted to another aspect ratio.

Currently, there are two commercial systems for recording/reproducing a television picture based on two respective video signals: one system has 4:3 aspect ratio (based on the so-called 4:3 video signal), while the other system has 16:9 aspect ratio (based on the so-called 16:9 video signal). To use the two systems interchangeably, an aspect ratio converter has been proposed, as disclosed in Japanese Patent Application Laid Open No. 5-252538 published in 1993. According to the Published Application, the video signal in an imaging device is either converted to a different aspect ratio or is passed through unmodified. In the former case, the video signal is changed by the aspect ratio converter prior to processing by, for example, a recording/reproducing system, while in the latter case the aspect ratio converter is bypassed whereby the original (unmodified) video signal is directly supplied to the recording/reproducing system.

In the imaging device, when the aspect ratio conversion of the video signal is carried out, a so-called group delay takes place whereby the video signal is delayed for a predetermined time period prior to the subsequent processing operations in the apparatus. A problem, however, occurs when the aspect ratio conversion is either discontinued or activated: the transition between the two states causes the group delay to change in the video signal delivery to the signal processing section following the aspect ratio conversion section. As a result, the signal processing operations may not be carried out properly.

A need therefore exists for a device and method that overcomes the above disadvantage.

OBJECTS OF THE INVENTION

It is, therefore, an object of the present invention to provide a digital signal processing device and imaging apparatus with an aspect ratio conversion section/system.

It is another object of the present invention to provide the digital signal processing device and imaging apparatus as aforesaid, in which when the aspect ratio conversion is terminated or set, the group delay remains constant (fixed) for the video signal.

It is a further object of the present invention to provide imaging apparatus for varying the aspect ratio of the video signal delivered to a main line system and the aspect ratio of the video signal delivered to a view finder system independently of each other.

SUMMARY OF THE INVENTION

According to one aspect, the invention is defined by imaging apparatus. Imaging means generates, at a first rate, a digital signal representing a video picture having a first aspect ratio based on an object image. Memory means having a storage capacity of at least one horizontal line of the video picture stores the digital signal. Clock generating means generates a write clock signal and a first read clock signal each having a first data rate. The clock generating means also generates a second read clock signal having a second data rate related to the first data rate by a preselected conversion ratio between the first aspect ratio and a second aspect ratio. Control means are operative in a first mode to store, at the first data rate, the digital signal in the memory means during a horizontal line period of the write clock signal, and to retrieve, at the first data rate, the digital signal during the horizontal line period. The digital signal is thus output at the first data rate from the memory means as the digital signal representing the video picture having the first aspect ratio and being delayed by the horizontal line period. The control means are further operative in a second mode to store, at the first data rate, the digital signal in the memory means during the horizontal line period, and to retrieve, at the second data rate, a portion of the digital signal during the horizontal line period. The digital signal is thus output at the second data rate from the memory means as the digital signal representing the video picture having the second aspect ratio and being delayed by the same horizontal line period.

In accordance with another aspect of the invention, the control means is operative in the first mode to control the memory means so as to retrieve the digital signal starting with a first sample of the digital signal stored in the memory means during each respective horizontal line period. The control means is further operative in the second mode to control the memory means so as to retrieve the digital signal starting with a preselected sample of the digital signal stored in the memory means during each respective horizontal line period independently of the first sample.

In accordance with still another aspect of the invention, imaging apparatus includes imaging means for generating a digital signal representing a video picture having a first aspect ratio based on an object image. First converting means provides a predetermined group delay to the generated digital signal and extracts at least a first portion of samples in a horizontal direction of the video picture defined by the digital signal. Second converting means provides the same predetermined group delay to the generated digital signal and extracts at least a second portion of samples in the horizontal direction independently of the first converting means. Display means connected to the second converting means displays the video picture based on the digital signal outputted from the second converting means. Operation means sets at least a first and a second operation mode for the first and second converting means. Control means controls the first and second converting means such that the first converting means extracts less samples from the digital signal than the second converting means when the first operation mode is set by the operation means.

In accordance with yet another aspect of the invention, in the first operation mode, the control means controls the first converting means to extract the first portion of samples such that the first aspect ratio of the video picture is converted to a second aspect ratio. The control means further controls the second converting means to extract the second portion of samples being equal to all the samples in the digital signal in the horizontal direction such that the first aspect ratio of the video picture remains unmodified.

BRIEF DESCRIPTION OF THE DRAWINGS

The above-mentioned as well as additional objects, features and advantages of the invention will become readily apparent from the following detailed description thereof which is to be read in conjunction with the accompanying drawings, in which.

In all Figures, like reference numerals represent the same or identical components of the invention.

DETAILED DESCRIPTION OF THE PREFERRED EMBODIMENTS

The invention will now be explained in detail with reference to the accompanying drawings.

Figure 1:
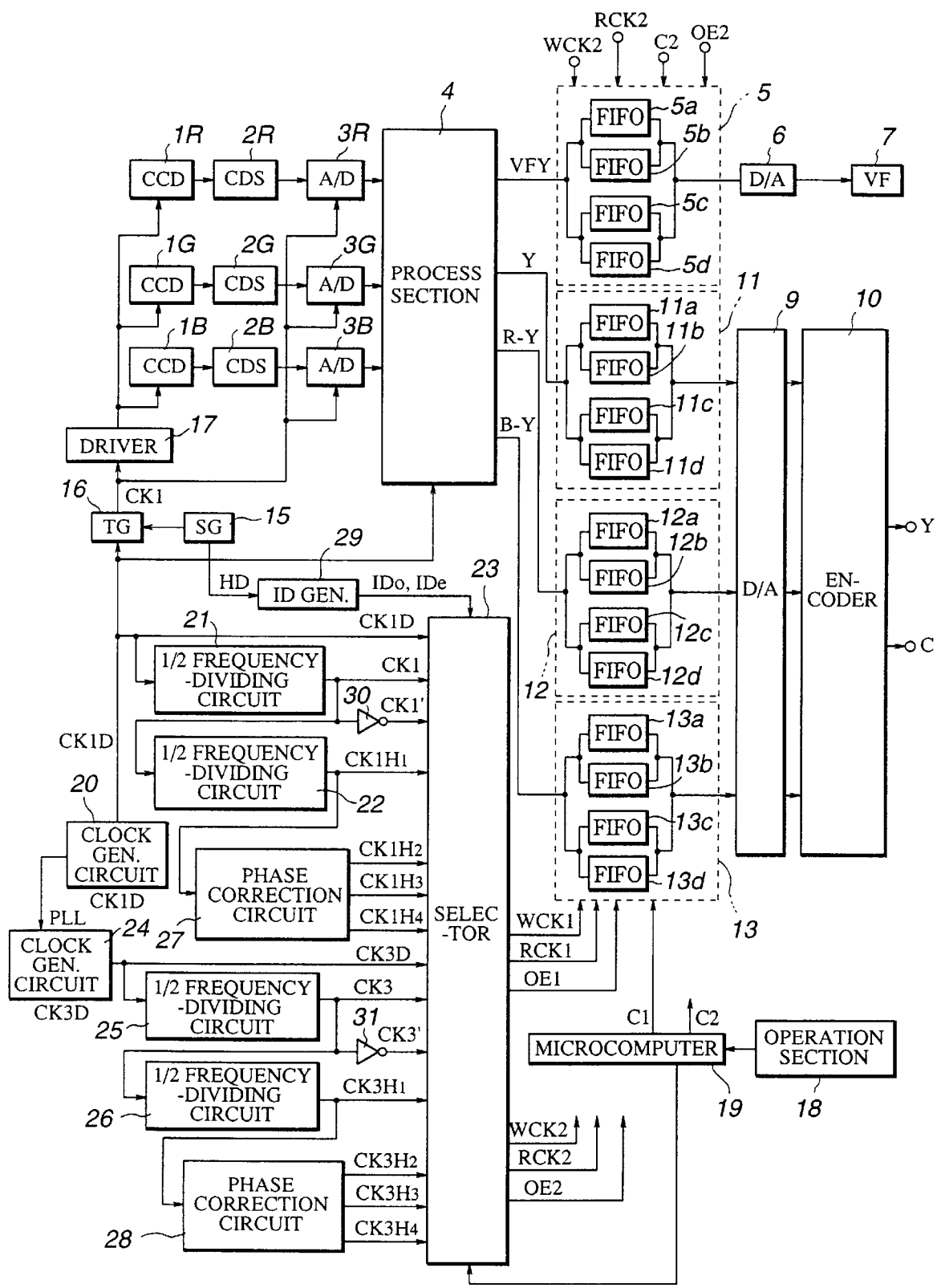
FIG. 1 is a block diagram of the video camera with an aspect ratio conversion feature according to the present invention.

FIG. 1 shows, in block diagram form, a color video camera comprising three Charge-Coupled Device (CCD) image sensor sections 1R, 1G, 1B (each comprising a plurality of CCD photo elements) for outputting respective image pick-up signals R(Red), G(Green), B(Blue) of three primary colors. Following the processing operations by Correlated Double Sampling (CDS) circuits 2R, 2G, and 2B, Analog-to-Digital (A/D) converters 3R, 3G, 3B convert the respective color image pick-up signals R, G, B to digital signals which are then supplied to a process section 4 as respective color image pick-up data.

As shown in FIG. 1, luminance data VFY (intended for a view finder section) is transferred from the process section 4 to a D/A converter 6 through an aspect ratio converting circuit 5. The aspect ratio converting circuit 5 is comprised of four FIFO memory units 5a–5d (buffer memory) connected in parallel with each other, as will be explained in detail hereinbelow. The D/A converter 6 converts the luminance data VFY to an analog signal for appropriate processing operations by a view finder 7 resulting in a picture signal which can be viewed by a video camera user, for example.

FIG. 1 further illustrates luminance data Y and color difference data R-Y, B-Y of the main line system being delivered from the process section 4 to a D/A converter 9 through aspect ratio converting circuits 11, 12, 13 which are comprised of respective 4-element FIFO memory units 11a–11d, 12a–2d, 13a–13d (buffer memory that is similar to the aspect ratio converting circuit 5). The D/A converter 9 converts the luminance data Y and the color difference data R-Y, B-Y of the main line system to analog signals which are then supplied to an encoder 10 as a luminance signal and color difference signals, respectively.

The video camera also includes a microcomputer 19 for controlling, among other things, the aspect ratio converting circuits 5, 11, 12, 13 in accordance with the operation of an operation section 18.

The CCD image sensor sections 1R, 1G, 1B separate image pick-up light incident through an optical low-pass filter and imaging lens (not shown) into three primary components by a light decomposing prism (not shown), as well known in the art. Three primary color images of an object are then output from the CCD image sensor sections 1R, 1G, 1B as respective color image pick-up signals R, G, B, each having 16:9 aspect ratio. The CCD image sensors 1R, 1G, 1B are controlled by a CCD driver 17 operating from a clock signal CK1 generated by a timing generator 16. The frequency of an input clock signal CK1D (36 MHz) is divided by two by the timing generator 16 to generate the clock signal CK1 of 18 MHz. Synchronized with a synchronizing signal from a sync generator 15, the clock signal CK1 is supplied to the A/D converters 3R, 3G, 3B for performing the analog-to-digital conversion at the input frequency (rate).

The clock signal CK1D from the clock generating circuit 20 is also supplied to a selector 23 and a ½ frequency-dividing circuit 21. The ½ frequency-dividing circuit 21 divides the clock frequency of 36 MHz to produce the clock signal CK1 (having 18 MHz frequency) for input to the selector 23, to an inverter 30 and to a ½ frequency-dividing circuit 22: the inverter 30 inverts phase of the clock signal CK1 to output a clock signal CK1' to the selector 23, while the ½ frequency-dividing circuit 22 divides frequency of the clock signal CK1 into half to deliver frequency (9 MHz) as the clock signal CK1H1, while the phase of each clock signal CK1H1, CK1H2, CK1H3, CK1H4 differs from each other by $\pi/2$.

Further, a clock generating circuit 24 generates a clock signal CK3D having 27 MHz frequency to the selector 23 and a ½ frequency-dividing circuit 25 which divides the frequency of the clock signal CK3D (27 MHz) into half to supply a clock signal CK3 having 13.5 MHz frequency to the selector 23, to an inverter 31 and to a ½ frequency-dividing circuit 26: the inverter 31 inverts the phase of the clock signal CK3 outputted from the ½ frequency-dividing circuit 25 to deliver a clock signal CK3' to the selector 23; while the ½ frequency-dividing circuit 26 divides the frequency of the clock signal CK3 (13.5 MHz) by a half to supply a clock signal CK3H1 having 6.75 MHz frequency to the selector 23 and a phase correction circuit 28. The phase correction circuit 28 generates three clock signals CK3H2, CK3H3, CK3H4 having the same frequency (6.75 MHz) as the clock signal CK3H1, while the phases of these 4 clock signals differ from each other by $\pi/2$.

FIG. 1 also shows a switching signal generator 29 being operative during the aspect ratio conversion for generating complementary switching signals IDo and IDe with phases shifted from each other by $\pi$. The switching signal IDo and IDe are generated in response to a horizontal synchronizing signal HD from the sync generator 15, whereby the switching signal IDo indicates the odd line by outputting an appropriate level signal to the selector 23, while the switching signal IDe indicates the even line by also outputting the appropriate level signal to the selector 23.

The microcomputer 19 controls the selector 23 to select write clock signals (WCK1, WCK2), read clock signals (RCK1, RCK2), and output enable signals (OE1, OE2) as a function of the operation mode selected in the operation section 18. The write/read clock signals and output enable signals all are based on the clock signals supplied to the selector 23 from various circuits (such as the ½ frequency-dividing circuits 21, 22, 25, 26, the phase correction circuits 27, 28, etc.) as described hereinabove. As controlled by the microcomputer 19, the selector 23 provides the write clock signal WCK1, the read clock signal RCK1, and the output enable signal OE1 to the aspect ratio converting circuits 11, 12, 13; and provides the write clock signal WCK2, the read clock signal RCK2 and the output enable signal OE2 to the aspect ratio converting circuit 5.

In accordance with FIG. 1, the CDS circuits 2R, 2G, 2B extract data portions from respective color image pick-up signals R, G, B obtained by the CCD image sensors 1R, 1G, 1B for eliminating random noise therein.

The A/D converters 3R, 3G, 3B convert, at a rate of the clock signal CK1, the color image pick-up signals R, G, B into respective color image pick-up data in which one sample may, for example, consist of 10 bits.

Driven by the clock signal CK1D from the clock generating circuit 20, the process section 4 carries out various picture (image) operations (such as image enhancement, pedestal addition, non-linear gamma/knee processing, etc.) on the color image pick-up data R, G, B. Then, the process section 4 performs matrix processing of the color image pick-up data R, G, B for converting to picture data comprising luminance data Y (VFY) and color difference data R-Y, B-Y. The luminance data (Y, VFY) is then supplied to the aspect ratio converting circuit 5 of the view finder section and to the aspect ratio converting circuits 11 of the main line section; while the color difference data R-Y, B-Y is input to the aspect ratio converting circuits 12, 13 of the main line section.

When the luminance data VFY (intended for the view finder section) undergoes the aspect ratio conversion in the aspect ratio converting circuit 5, odd lines of the luminance data VFY are written into the FIFO memory units 5a and 5b, and even lines of the luminance data VFY are written into the FIFO memory units 5c and 5d. More specifically, odd samples of the odd lines are written into the FIFO memory unit 5a, and even samples of the odd lines are written into the FIFO memory unit 5b. Similarly, odd samples of the even lines are written into the FIFO memory unit 5c, and even samples of the even lines are written into the FIFO memory unit 5d.

According to this arrangement, when the odd lines of the luminance data VFY are written into the FIFO memory units 5a and 5b on the basis of the write clock signal WCK2, the even lines of the luminance data VFY are read out from the FIFO memory units 5c and 5d on the basis of the read clock signal RCK2. Conversely, when the odd lines of the luminance data VFY are read out from the FIFO memory units 5a and 5b on the basis of the read clock signal RCK2, the even lines of the luminance data VFY are written into the FIFO memory units 5c and 5d on the basis of the write clock signal WCK2.

In this particular embodiment, the FIFO memory units 5a and 5b (5c and 5d) have a combined storage capacity of at least one horizontal line time period (hereinafter referred to as "1H period") for storing the luminance data VFY. That is, the luminance data VFY corresponding to at least 1H period is stored in the FIFO memory units 5a and 5b (5c and 5d).

Similar to the aspect ratio converting circuit 5, when the aspect ratio conversion is carried out in the aspect ratio converting circuits 11, 12, 13 supplied with luminance data Y and color difference data R-Y, B-Y of the main line section, samples of the odd lines are written into the FIFO memory units 11a, 11b, 12a, 12b, 13a, 13b; and samples of the even lines are written into the FIFO memory units 11c, 11d, 12c, 12d, 13c, 13d.

Figure 2:
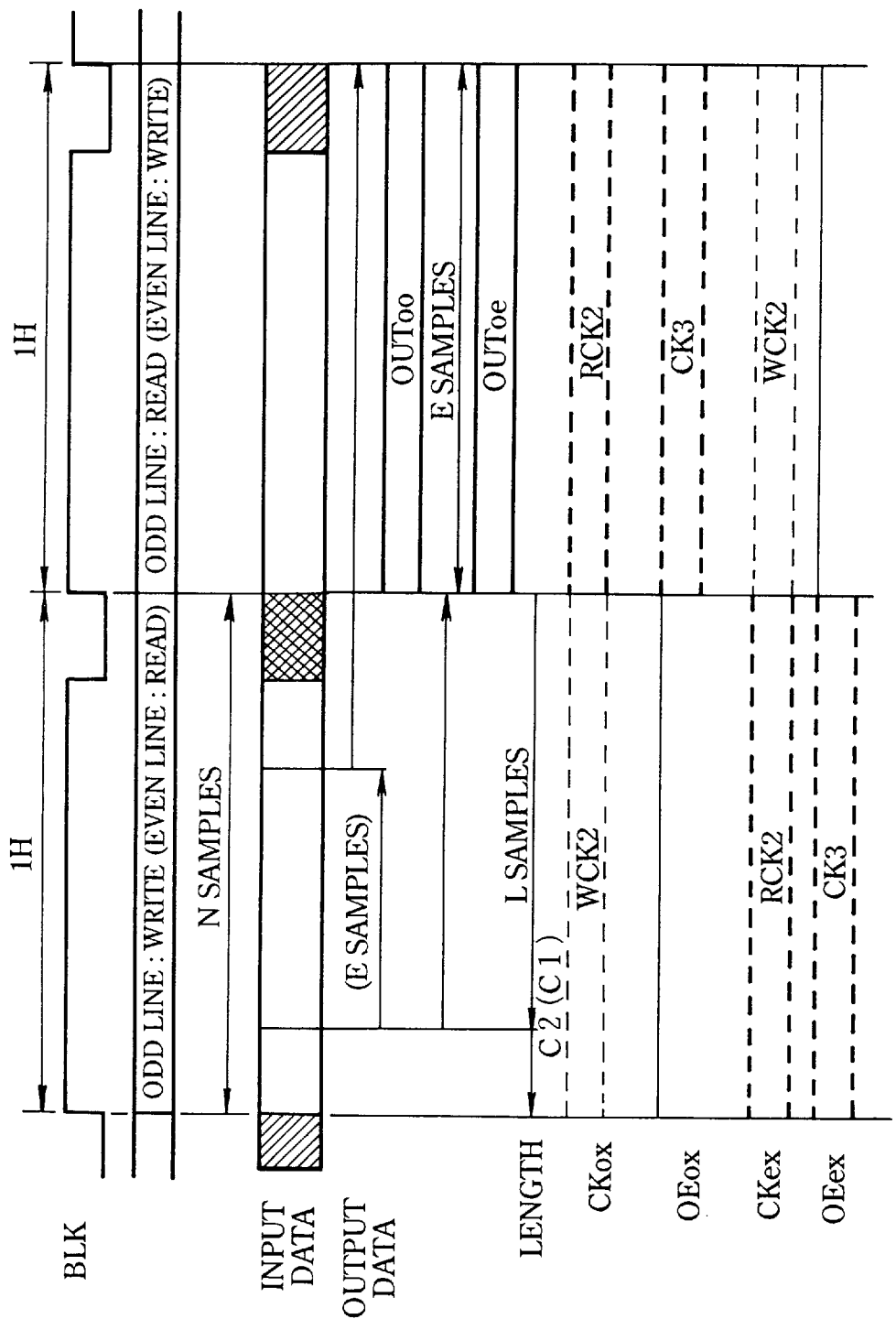
FIG. 2 is a timing chart illustrating data extraction and group delay operations in an aspect ratio converting circuit of the video camera during the aspect ratio conversion.

Next, the aspect ratio conversion will be explained in detail. As an example, the aspect ratio conversion from 16:9 to 4:3 will be described with respect to the aspect ratio converting circuit 5. In FIG. 2, input data is the luminance data VFY supplied from the process section 4 to the aspect ratio converting circuit 5. This input data is synchronized with the horizontal blanking signal BLK of the 1H period, and is comprised of N samples (including the horizontal blanking period). During the conversion, the aspect ratio converting circuit 5 stores the luminance data VFY to the FIFO memory units 5a–5d in accordance with the write clock signal WCK2 (CK1) having 18 MHz frequency, and retrieves a portion of the stored luminance data VFY based on the read clock signal RCK2 (CK3) having 13.5 MHz frequency to thereby carry out the aspect ratio conversion of 16:9 to 4:3.

Namely, when the operation mode is set for converting the aspect ratio of the view finder (VF) section or the main line section from 16:9 to 4:3, the microcomputer 19 controls the selector 23 so as to select clock signals CK1, CK1' as write clock signals WCK1 (WCK2); and to select clock signals CK3, CK3' as read clock signals RCK1 (RCK2). In addition, the microcomputer 19 generates an extraction signal C1 (corresponding to this operation mode) and supplies it to the aspect ratio converting circuits 11, 12, 13 of the main line section; and also generates an extraction signal C2 for the aspect ratio converting circuit 5 of the VF section.

The extraction signals C1, C2 provide a read-out start position of the picture data: the address indicating a location in the FIFO memory units from which the retrieval (read-out) of the picture data is initiated. The read-out start position is defined by the number of samples L as counted from the last sample in the 1H period, where the total number of samples is assumed to be N in the FIFO memory units during the 1H period. The microcomputer 19 sets the extraction start position on the basis of the user-manipulated operation section 18.

The FIFO memory units 5a, 5b are respectively supplied with the clock signals CK1, CK1' as the write clock signal WCK2 from the selector 23. As shown in the first 1H period of FIG. 2, the luminance data of N samples in the odd line (luminance data of all odd-line samples during the 1H period) are alternately written into the FIFO memory units 5a, 5b based on the write clock signal WCK2 (CK1, CK1'). In FIG. 2, a CKox signal indicates the write clock signal WCK2 (CK1, CK1') and read clock signal RCK2 (CK3, CK3') for carrying out the write/read operations, respectively, of the odd-line luminance data VFY with respect to the FIFO memory units 5a, 5b. The CKox is a two-phase clock signal with a first phase corresponding to the odd samples and a second phase corresponding to the even samples of the odd lines. An OEox signal signifies the output enable signal OE2 for outputting the retrieved odd-line luminance data VFY from the FIFO memory units 5a, 5b. The OEox signal includes a two phase clock signal in which "High" (inactive) level is set during the write period of the luminance data VFY of the odd lines, and "Low" (active) level is set during the read period in correspondence with the read clock signals RCK2 (CK3, CK3'). This two-phase clock signal is shown as CKxo and CKxe in FIG. 5 which is described hereinbelow.

During the write (store) period of the odd-line luminance data VFY, the OEox signal is assigned the "High" level, whereby the odd-line luminance data VFY is alternately written into the FIFO memory units 5a, 5b, wherein the output is disabled. During the read (retrieve) period of the odd-line luminance data VFY, the OEox signal is controlled so as to alternately take on the "High" and "Low" levels in correspondence with the read clock signal RCK2 (CK3, CK3'), whereby the odd-line luminance data VFY are retrieved and outputted from the FIFO memory units.

Figure 3:
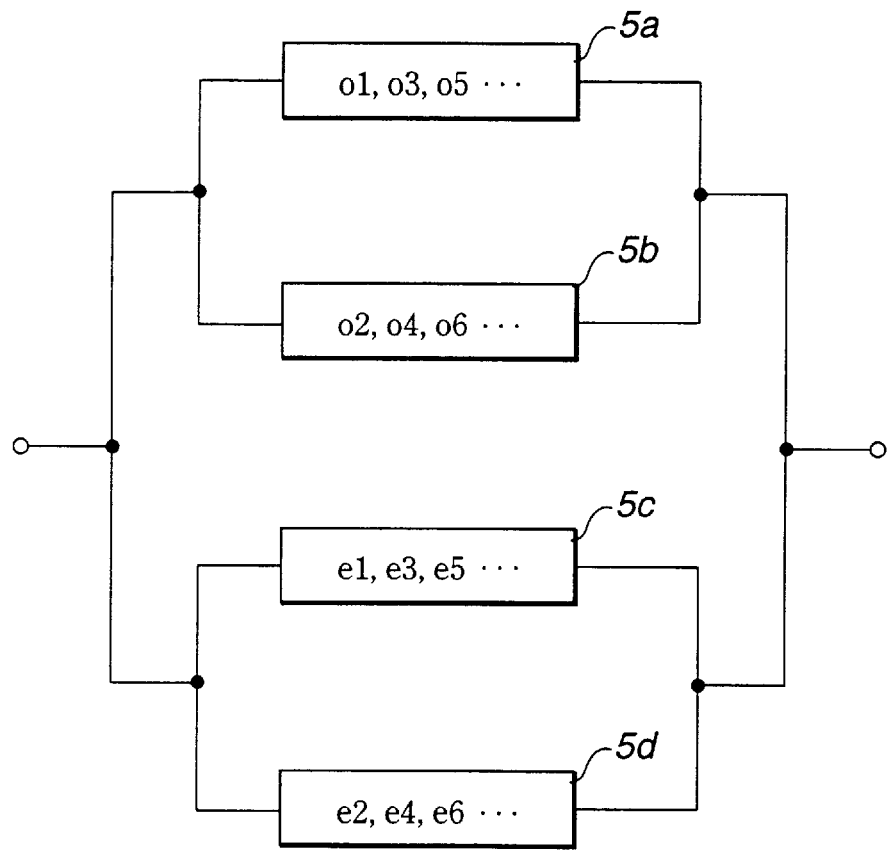
FIG. 3 is a block diagram of the aspect ratio converting circuit illustrating the picture data stored in respective FIFO memory units during the aspect ratio conversion.

Namely, during the write period of the odd-line luminance data VFY as shown in FIG. 3, odd samples (o1, o3, o5 . . . ) are written into the FIFO memory unit 5a, and even samples (o2, o4, o6 . . . ) are written into the FIFO memory unit 5b. During the next 1H period (that is, the read period of the odd-line luminance data VFY), the luminance data VFY of E samples following the extraction start position (as indicated by the signal C2) are alternately retrieved from the FIFO memory units 5a, 5b, and are outputted as the luminance data VFY of the odd lines. In FIG. 2, OUToo indicates the odd-line odd samples read from the FIFO memory unit 5a, and OUToe indicates the odd-line even samples retrieved from the FIFO memory unit 5b. The OUTxo and OUTxe of FIG. 5 correspond to the OUToo and OUToe, respectively.

As further shown in FIG. 2, CKex indicates the write clock signal WCK2 (CK1, CK1') and read clock signal RCK2 (CK3, CK3') for carrying out the write/read operations of the even-line luminance data VFY with respect to the FIFO memory units 5c, 5d. OEex indicates the output enable signal OE2 for outputting the retrieved even-line luminance data VFY. Similar to the FIFO memory units 5a, 5b, the even-line luminance data VFY is written to the FIFO memory units 5c, 5d according to the write clock signal WCK2 (CK1, CK1'); the extraction start position is set on the basis of the extraction signal C2, and the luminance data VFY (E samples) is extracted based on the read clock signal RCK2 (CK3, CK3'). It is noted that the FIFO memory units 5a, 5b (5c, 5d) are supplied with clock signals having opposite phases during the write/read operations.

In particular, the read period of the odd-line luminance data VFY corresponds to the write period of the even-line luminance data VFY, such that the even-line luminance data of N samples (the luminance data of all samples during the 1H period) are alternately written into the FIFO memory units 5c, 5d in accordance with the write clock signal WCK2 (CK1, CK1'). As shown in FIG. 3, even-line odd samples (e1, e3, e5 . . . ) are written into the FIFO memory unit 5c, and even-line even samples (e2, e4, e6 ) are written into the FIFO memory unit 5d. During the next 1H period, the luminance data VFY of E samples (following the extraction start position as indicated by the signal C2) are alternately read from the FIFO memory units Sa, 5b, and are outputted as odd-line luminance data VFY.

As shown during the second 1H period in FIG. 2, 5 according to the operation of the aspect ratio converting circuit 5, the luminance data VFY of E samples are read from the FIFO memory units 5a, 5b (5c, 5d) during the entire 1H period, because the E samples are outputted in accordance with the read clock signal RCK2 (from the set extraction start position) which is slower than the write clock signal WCK2 (that is, N x RCK2/WCK2). Accordingly, when the aspect ratio is converted from 16:9 to 4:3, the aspect ratio converting circuit 5 extracts ¾ of the luminance data VFY as the read data, thereby achieving the group delay of 1H period.

As described above, the aspect ratio converting circuit 5 has a memory storage (two FIFO memory units) for writing the luminance data VFY at a first predetermined timing, and another memory storage (two FIFO memory units) for reading the extracted luminance data VFY at a second predetermined timing during the aspect ratio conversion of the luminance data VFY. Accordingly, in contrast with the case where one FIFO memory unit is used, the clock rates of the write clock signal WCK2 and the read clock signal RCK2 can be reduced by one half. It, therefore, becomes unnecessary to use expensive FIFO memory devices for keeping up with the high frequency of the write/read clock signal.

Figure 4:
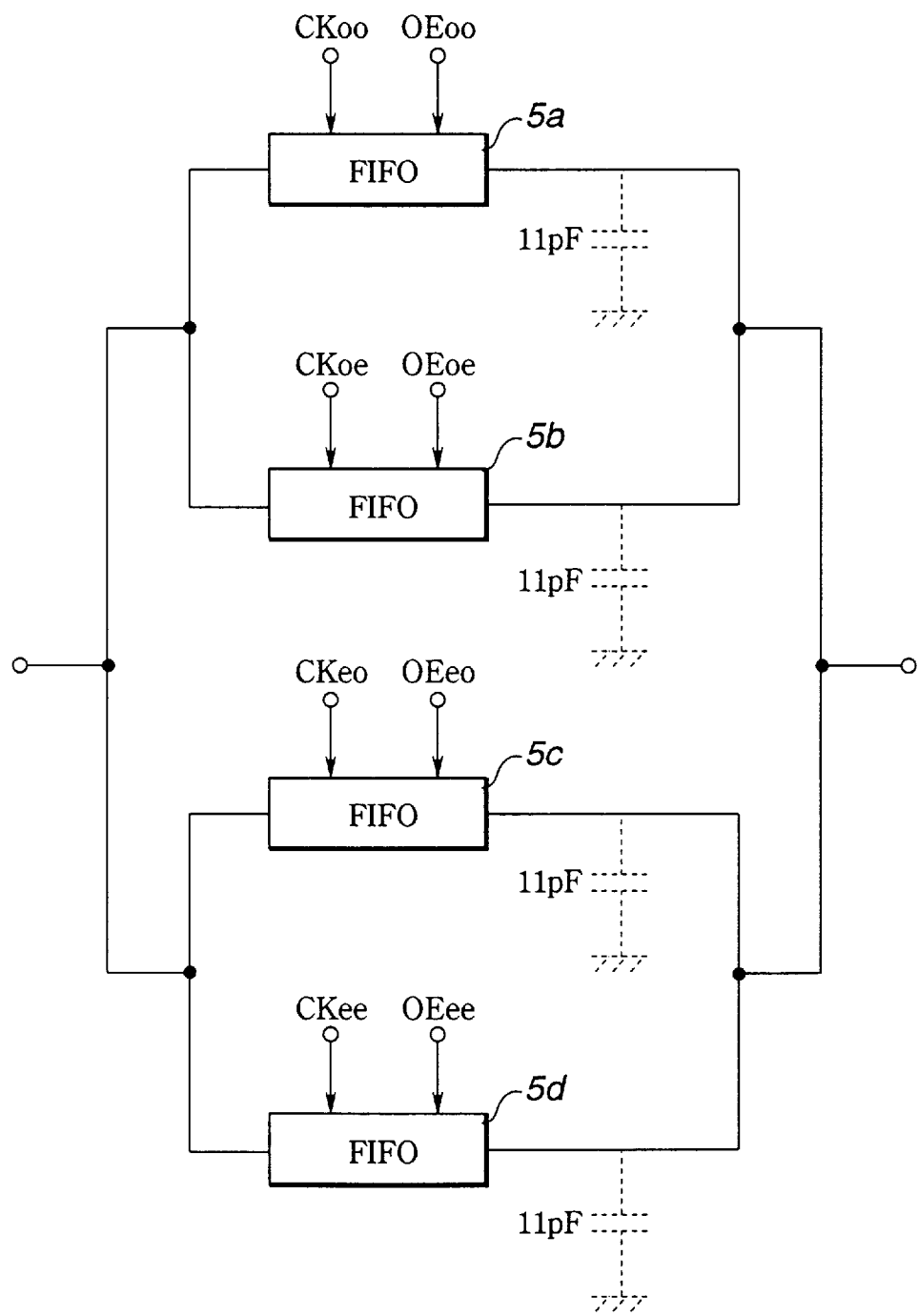
FIG. 4 is a block diagram of output portions for the respective FIFO memory units.

Further in accordance with the present invention, in the aspect ratio converting circuit 5 comprised of 4 FIFO memory units 5a–5d connected in parallel as shown in FIG. 4, the read clock signal RCK2 (CKoo) and output enable signal OE2 (OEoo) are delivered to the FIFO memory unit 5a during the aspect ratio conversion to thereby read the odd-line odd samples from the FIFO memory unit 5a, and to deliver the read clock signal RCK2 (CKoe) and the output enable signal OE2 (OEoe) to the FIFO memory unit 5b to thereby read the odd-line even samples from the FIFO memory unit 5b. The read clock signal RCK2 (CKeo) and output enable signal OE2 (OEeo) are supplied to the FIFO memory unit 5c to read luminance data VFY of even-line odd samples from the FIFO memory unit 5c, while the read clock signal RCK2 (CKee) and output enable signal OE2 (OEee) are provided to the FIFO memory unit 5d to read out luminance data VFY of even-line even samples from the FIFO memory unit 5d.

Figure 5:
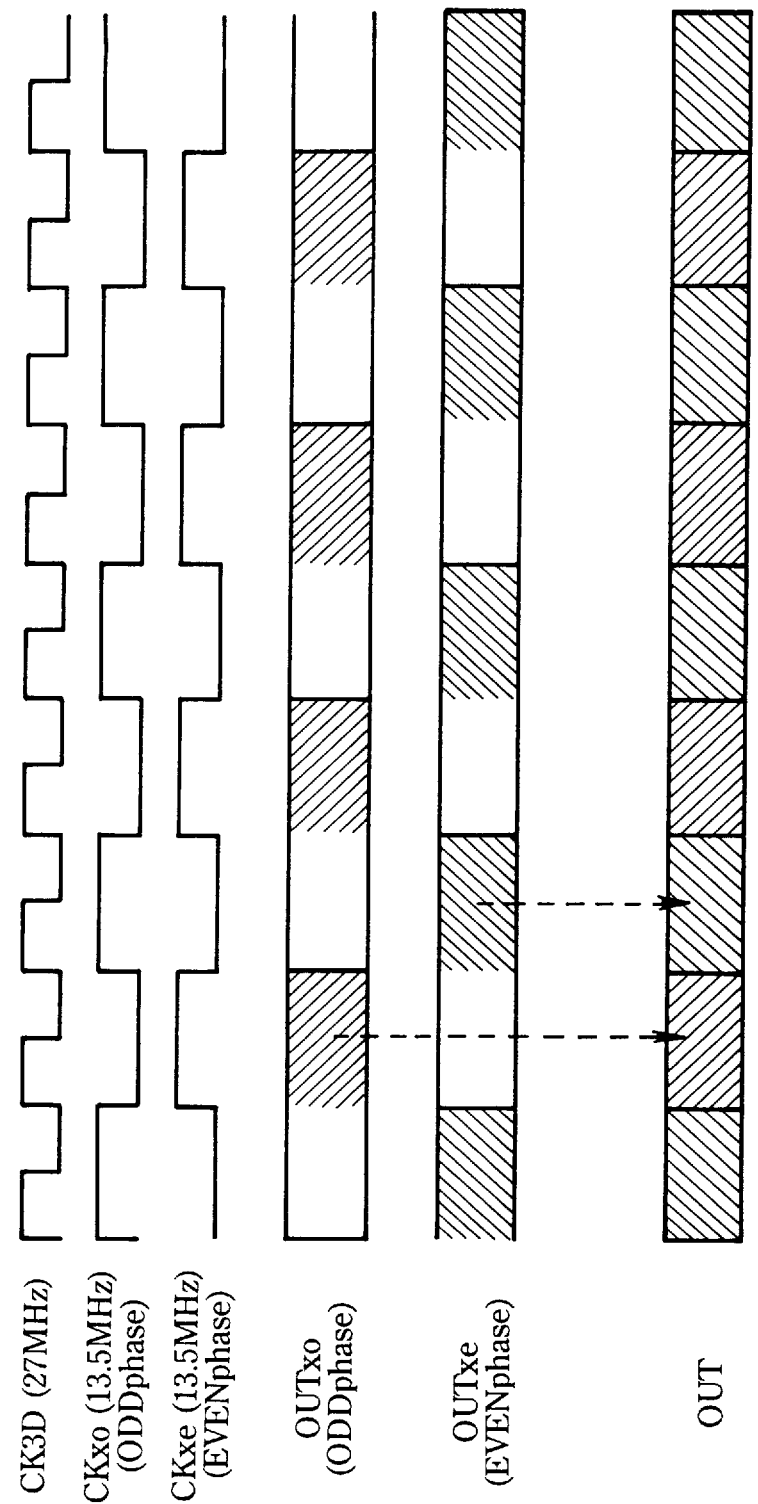
FIG. 5 is a timing chart illustrating control signals during the aspect ratio conversion.

The FIFO read-out control timing during the aspect ratio conversion is shown in FIG. 5. The read clock signal RCK2 (CKxo) for reading out luminance data VFY of odd samples and the read clock signal RCK2 (CKxe) for reading out luminance data VFY of even samples have phases opposite each other. The read clock signal RCK2 (CKxo) is the clock signal CK3 obtained by dividing frequency (27 MHz) of the clock signal CK3D (generated by the clock generating circuit 24) into one half by the ½ frequency-dividing circuit 25. Moreover, the read clock signal RCK2 (CKxe) is the CK3' signal obtained by inverting the phase of the clock signal CK3 using the inverter 31.

In this case, x in the CKxe and CKxo indicates that the clock signal is common to all lines. Namely, CKoe and CKee represent the same clock signal, as do CKoo and CKeo.

Further, output data OUTxo of odd samples which are read from the FIFO memory unit 5a or the FIFO memory unit 5c by the read clock signal RCK2 (CKxo) is outputted during the time period when the output enable signal OE2 (OExo) (synchronous with the read clock signal RCK2 (CKxo)) is at "Low" level. Moreover, output data OUTxe of even samples which are read from the FIFO memory unit 5b or the FIFO memory unit 5d by the read clock signal RCK2 (CKxe) is outputted during the time period when the output enable signal OE2 (OExo) (synchronous with the read clock signal RCK2 (CKxo)) is at "Low" level. Thus, output data OUTxo of odd samples and output data OUTxe of even samples are combined into multiplexed data OUT.

Namely, the four FIFO memory units 5a–5d being connected to each other in parallel and constituting the aspect ratio converting circuit 5 are adapted so that, for the time period during which the output enable signal OE2 is at "High" level, output is in the high impedance state. When the output enable signal OE2 of "Low" level is supplied, the FIFO outputs are alternately selected whereby the luminance data VFY is read out.

Figure 6:
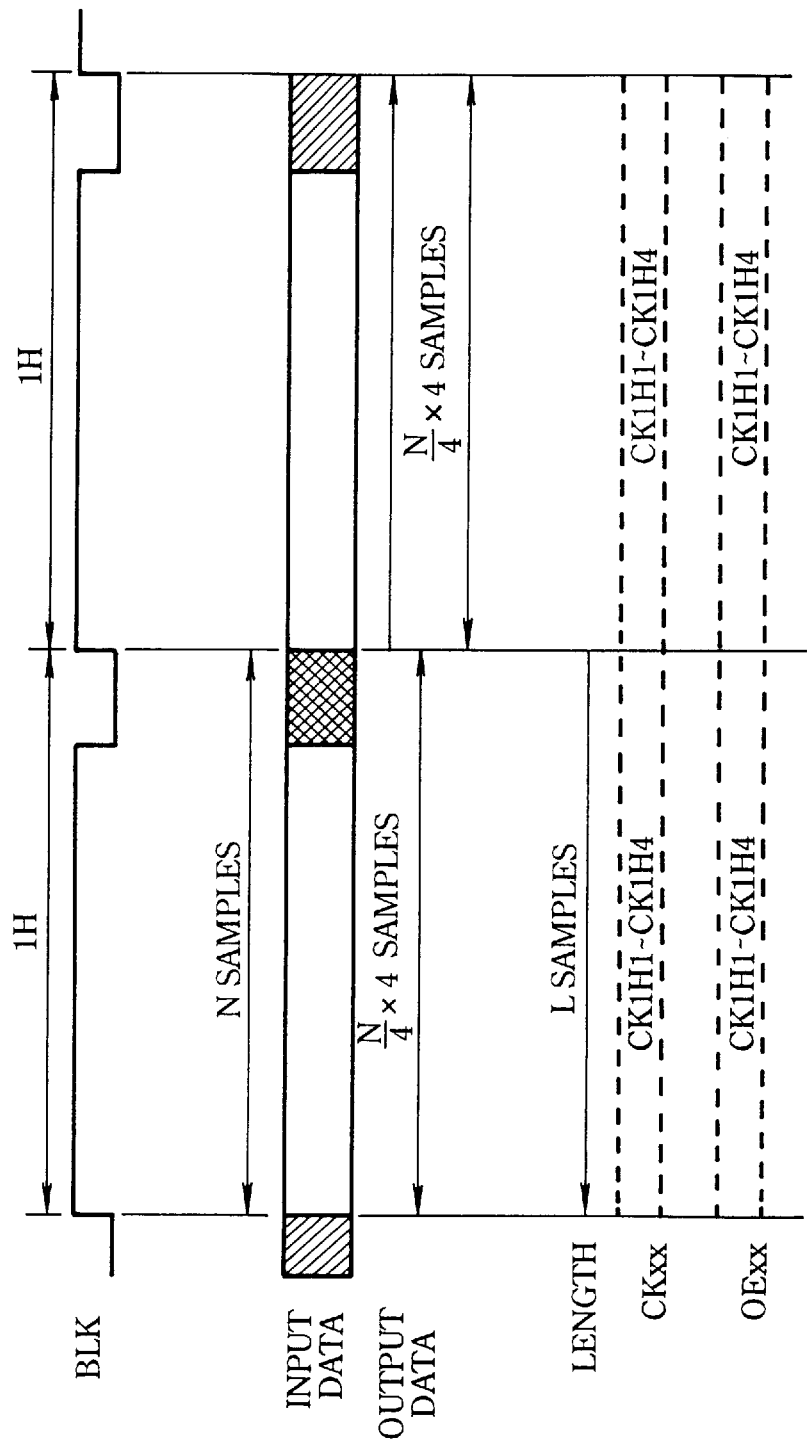
FIG. 6 is a timing chart illustrating data extraction and group delay operations when the aspect ratio conversion is not carried out.

The case where no conversion of the aspect ratio is carried out will now be described. Explanation will be given here with reference to FIG. 6 by referring again to the aspect ratio converting circuit 5. In FIG. 6, input luminance data VFY is supplied from the process section 4 t o the aspect ratio converting circuit 5. The luminance data is synchronous with the horizontal blanking signal BLK of 1H period, and is comprised of N samples.

In this case, the aspect ratio converting circuit 5 writes the luminance data VFY into the FIFO memory units 5a–5d in accordance with the write clock signal WCK2 (CK1H1–CK1H4) having frequency of 9 MHz. All of the written luminance data is retrieved in accordance with the read clock signal RCK2 (CK1H1–CK1H4) of 9 MHz to thereby output luminance data VFY as is (without carrying out the aspect ratio conversion). Thus, even when no aspect ratio conversion is carried out, similar to the case where extraction of the above-described luminance data VFY is performed, the aspect ratio converting circuit 5 permits the luminance data VFY to have group delay of 1H period.

Namely, when the operation mode is set to the pass-through mode (where no conversion of the aspect ratio is carried out) by the operation section 18, the microcomputer 19 controls the selector 23 so as to select clock signals CK1H1–CK1H4 which have been phase-corrected by the phase correction circuit 27 as the write clock signal WCK2 and the read clock signal RCK2. The selector 23 is adapted to deliver, as controlled by the microcomputer 19, the write clock signal WCK2 (CK1H1–CK1H4), read clock signal RCK2 (CK1H1–CK1H4) and output enable signal OE2 (CK1H1–CK1H4) (having phases shifted by $\pi/2$) to the FIFO memory units 5a–5d of the aspect ratio converting circuit 5. Namely, the write clock signal WCK2 (CK1H1), the read clock signal RCK2 (CK1H1) and the output enable signal OE2 (CK1H1) are delivered to the FIFO memory unit 5a, the write clock signal WCK2 (CK1H2), the read clock signal RCK2 (CK1H2) and the output enable signal OE2 (CK1H2) are delivered to the FIFO memory unit 5b, the write clock signal WCK2 (CK1H3), the read clock signal RCK2 (CK1H3) and the output enable signal OE2 (CK1H3) are delivered to the FIFO memory unit 5c, and the write clock signal WCK2 (CK1H4), the read clock signal RCK2 (CK1H4) and the output enable signal OE2 (CK1H1–CK1H4) are delivered to the FIFO memory unit 5d. In this case, the read clock signal RCK2 (CK1H1–CK1H4) has a predetermined phase delay with respect to the write clock signal WCK2 (CK1H1–CK1H4).

Moreover, in this pass-through mode, the microcomputer 19 uses the number of samples N corresponding to 1H period as the number of samples L which define the address indicating the extraction start position of picture data. The microcomputer 19 supplies the extraction signal C2 to the aspect ratio converting circuit which designates the leading address of the FIFO memory units 5a–5d. The FIFO memory units 5a–5d are operative so that when the extraction signal C2 is received from the microcomputer 19, the extraction start position is set to the first address. Namely, the FIFO memory units 5a–5d are set so that all the luminance data VFY are read out.

Further, the luminance data VFY delivered to the aspect ratio converting circuit 5 are written into the FIFO memory units 5a –5d in synchronism with the write clock signal WCK2 (CK1H1–CK1H4) sequentially distributed between the FIFO memory units 5a–5d. Accordingly, luminance data VFY of N samples are supplied to the FIFO memory units 5a–5d, whereby N/4 samples are respectively written therein.

Figure 7:
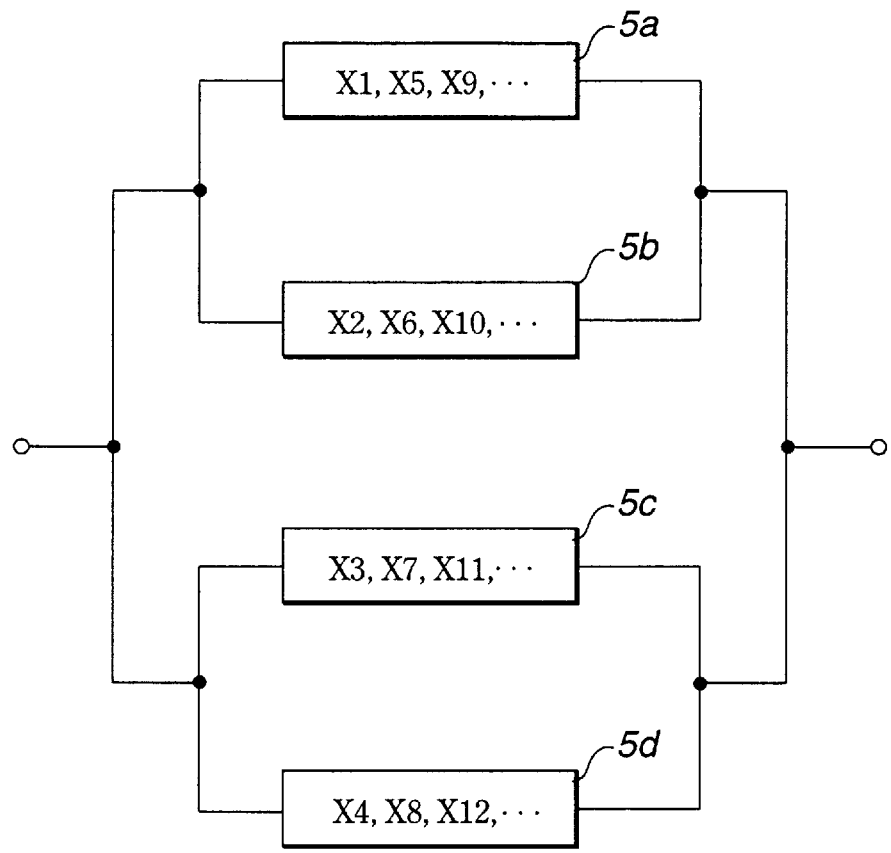
FIG. 7 is a block diagram of the aspect ratio converting circuit illustrating the picture data stored in the respective FIFO memory units when the aspect ratio conversion does not take place.

Namely, as shown in FIG. 7, luminance data VFY (x1, x5, x9 ) are written into the FIFO memory unit 5a every 4 samples by the write clock signal WCK2 (CK1H1), luminance data VFY (x2, x6, x10 . . . ) are written into the FIFO memory unit 5b every 4 samples by the write clock signal WCK2 (CK1H2), luminance data VFY (x3, x7, x11 . . . ) are written into the FIFO memory unit 5c every 4 samples by the write clock signal WCK2 (CK1H3), and luminance data VFY (x1, x5, x9 . . . ) are written into the FIFO memory unit 5d every 4 samples by the write clock signal WCK2 (CK1H4). In this case, x of x1, x2 . . . indicates that corresponding line may be odd or even line.

In this case, in FIG. 6, CKxx indicates the write clock signal WCK2 (CK1H1–CK1H4) and read clock signal RCK2 (CK1H1–CK1H4) for carrying out write/read operations of the luminance data VFY. This CKxx is a 4-phase clock signal (CK1H1–CK1H4) corresponding to the reading/writing of respective samples to each FIFO unit. Moreover, OExx indicates the output enable signal OE2 (CK1H1–CK1H4) for outputting the luminance data VFY from the FIFO memory units 5a–5d. This OExx is also a 4-phase clock signal corresponding to the respective samples of luminance data VFY which are read out from the FIFO memory units 5a–5d (that is, the 4-phase clock signal being at "Low" level only during the output period of one sample synchronized with the read clock signal RCK2 (CK1H1–CK1H4).

Further, all samples of the luminance data VFY which have been respectively written into the FIFO memory units 5a, 5b, 5c, 5d are read out from the memory as synchronized by the read clock signal RCK2 (CK1H1–CK1H4). Thus, the group delay of 1H period is similarly obtained as when the aspect ratio conversion is carried out.

As stated above, in the aspect ratio converting circuit 5 in the pass-through mode, the luminance data VFY of odd or even lines comprised of N samples are written into the FIFO memory units 5a–5d in the 1H period at the timing of the write clock signal WCK2 (CK1H1–CK1H4), and all of the luminance data VFY of even or odd lines which have been written during the previous 1H period are read out at the timing of the read clock signal RCK2 (CK1H1–CK1H4). So that the write timing does not overtake the read timing, the read clock signal RCK2 (CK1H1–CK1H4) has a predetermined phase delay with respect to the write clock signal WCK2 (CK1H1–CK1H4). Thus, the aspect ratio converting circuit 5 can output the luminance data VFY without changing the group delay (value), irrespective of presence or absence of the aspect ratio conversion. Accordingly, it is unnecessary to have a phase adjustment of the signal processing system provided at the aspect ratio converting circuit 5 and subsequent circuits.

Figure 8:
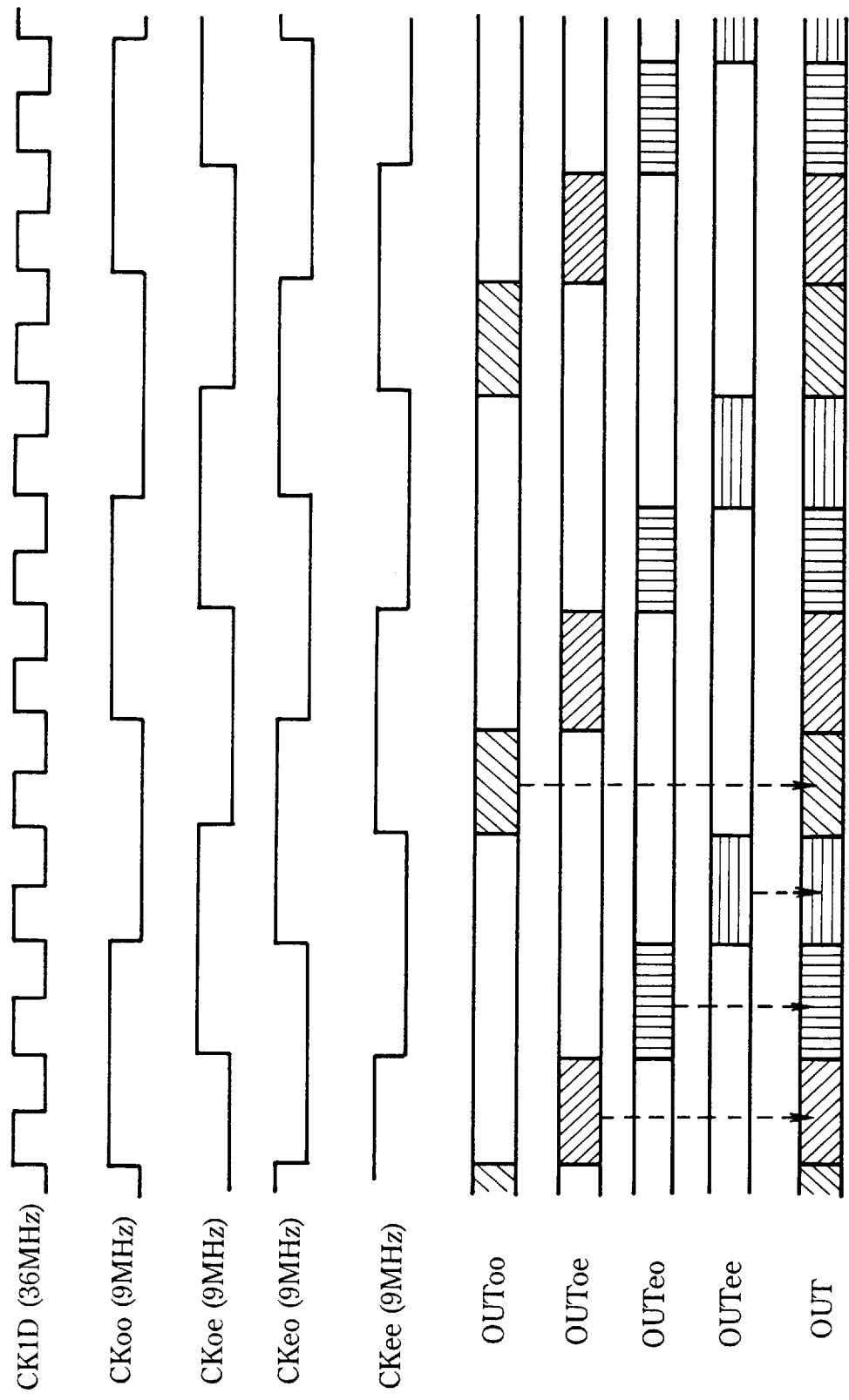
FIG. 8 is a timing chart illustrating control signals when the aspect ratio conversion is not carried out.

The FIFO read-out control signals in the aspect ratio converting circuit 5 in the pass-through mode is shown in FIG. 8.

In the FIG. 8 as mentioned above, CKoo indicates read clock signal RCK2 (CK1H1) for reading the luminance data VFY from the FIFO memory unit 5a, CKoe indicates read clock signal RCK2 (CK1H2) for reading the luminance data VFY from the FIFO memory unit 5b, CKeo indicates read clock signal RCK2 (CK1H3) for reading the luminance data VFY from the FIFO memory unit 5c, and CKee indicates read clock signal RCK2 (CK1H4) for reading the luminance data VFY from the FIFO memory unit 5d. Moreover, OUToo indicates output from the FIFO memory unit 5a (in correspondence with CKoo); OUToe indicates output from the FIFO memory unit 5b (in correspondence with CKoe); OUTeo indicates output from the FIFO memory unit 5c (in correspondence with CKeo); and OUTee indicates output from the FIFO memory unit 5d (in correspondence with CKee).

Namely, in this pass-through mode, the clock signal CK1H1 of 9 MHz (obtained by dividing the frequency (36 MHz) of the clock signal CK1D generated by the clock generating circuit 20 into one fourth by the ½ frequency-dividing circuits 21, 22) and three clock signals CK1H2, CK1H3 and CK1H4 having their phases different from each other by $\pi/2$ (generated from the clock signal CK1H1 by the phase correcting circuit 27) are used as the read clock signal RCK2 (CK1H1–CK1H4) for reading the luminance data VFY from the FIFO memory units 5a–5d.

Further, the respective output signals OUToo, OUToe, OUTeo, OUTee from the FIFO memory units 5a–5d are caused to be at "Low" level in correspondence with the 4-phase read clock signal RCK2 (CK1H1–CK1H4), and are multiplexed with each other, whereby the multiplexed data thus obtained is outputted as output data OUT as shown in FIG. 8.

While it has been described that the write clock signal WCK2, the read clock signal RCK2, the output enable signal OE2 and the extraction signal C2 are supplied to the aspect ratio converting circuit 5 to allow it to be operative in the aspect ratio converting mode and in the pass-through mode, the respective clock signals WCK2 and RCK2 are practically used as a single clock signal with respect to the FIFO memory units 5a 5d, that is, the single clock signal is operative as two different clock signals based on whether or not the output enable signal OE2 (with respect to the FIFO memory units 5a–5d) is at High or Low level. Namely, when the output enable signal OE2 is at High level, the above-mentioned clock signal is operative as the read clock signal RCK, while when the output enable signal OE2 is at Low level, it is operative as the write clock signal WCK.

Another embodiment of the aspect ratio converting circuit according to this invention will now be described. While the explanation will be given, by way of example, of the aspect ratio converting circuit 5, it is understood of course that the following description similarly applies to the aspect ratio converting circuits 11, 12, 13.

Since outputs of the FIFO memory units 5a–5d are directly connected to each other in the ratio converting circuit 5 as shown in FIG. 4, the output capacitance (about 11 pF) of the FIFO memory units 5a–5d are added to each other as parasitic capacitance. Accordingly, when the luminance data VFY is outputted from the FIFO memory unit 5a, there is a possibility that this luminance data VFY may be affected by the output capacitance of other FIFO memory units 5b, 5c, 5d thereby failing to provide satisfactory picture data.

Figure 9:
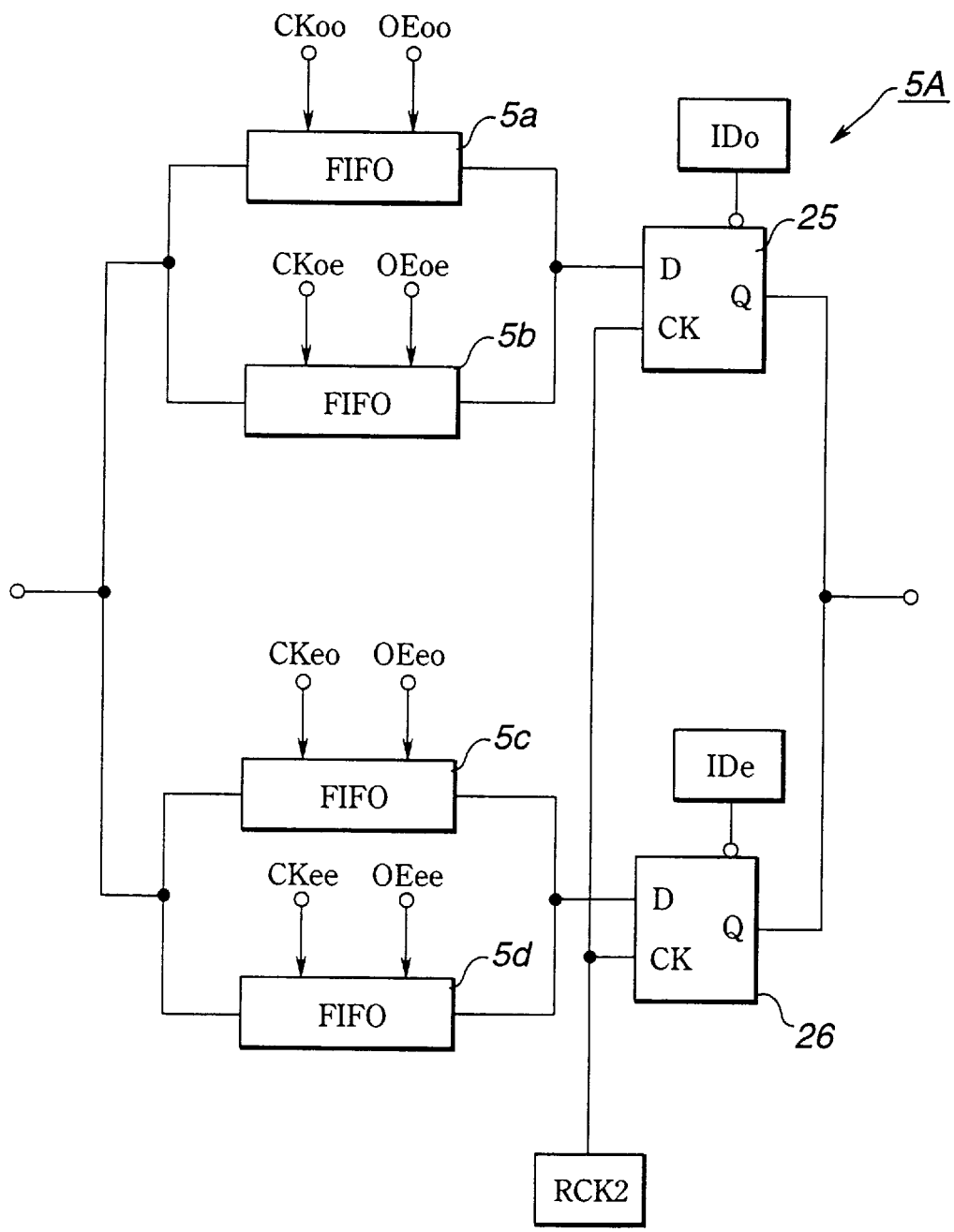
FIG. 9 is a block diagram of the aspect ratio converting circuit according to another embodiment of the present invention.

In view of the above, the embodiment shown in FIG. 9 prevents such a drawback due to the output capacitance.

An aspect ratio converting circuit 5A shown in FIG. 9 corresponding to the aspect ratio converting circuit 5 in the above-described embodiment comprises FIFO memory units 5a, 5b in which the input and the output are connected in parallel. A D-type flip-flop 25 is connected to the output of the FIFO memory units 5a, 5b. Similarly, FIFO memory units 5c, 5d have the input and the output connected in parallel. while a D-type flip-flop 26 is connected to the output of the FIFO memory units 5c, 5d.

Also in this aspect ratio converting circuit 5A, on the basis of the write clock signal WCK2 (CK1, CK1') during the aspect ratio conversion, luminance data VFY of odd lines are alternately written into the FIFO memory units 5a, 5b, and luminance data VFY of even lines are alternately written into the FIFO memory units 5c, 5d. Further, on the basis of the read clock signal RCK2 (CK3, CK3'), the luminance data VFY of odd lines are alternately read from the FIFO memory units 5a, 5b, and the luminance data VFY of even lines are alternately read from the FIFO memory units 5c, 5d.

Figure 10:
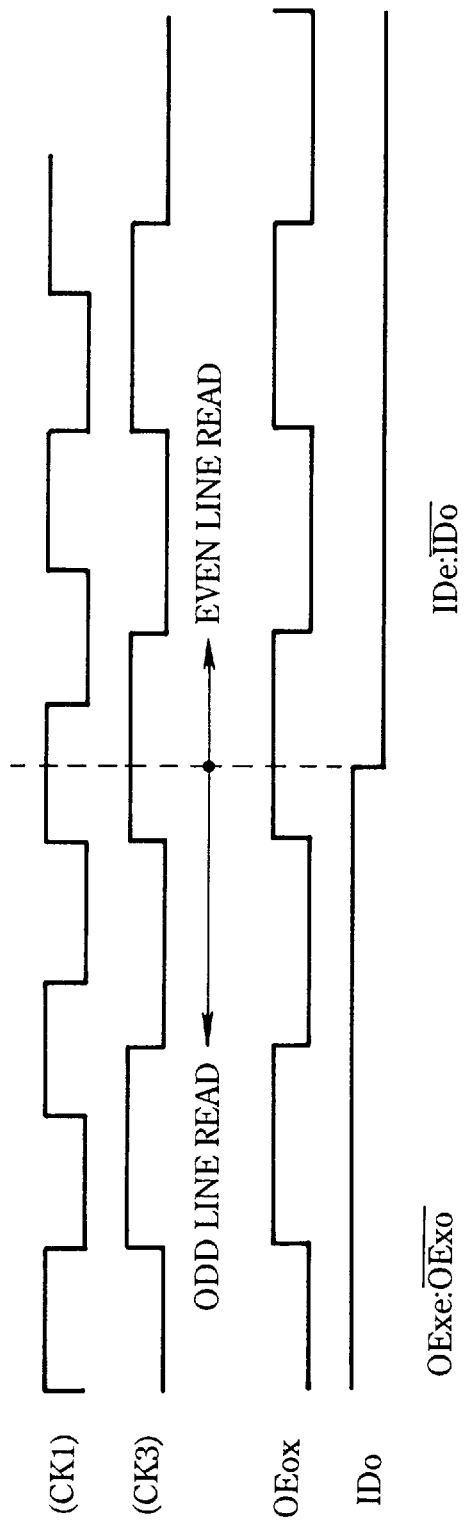
FIG. 10 is a timing chart illustrating switching signals IDo, IDe in the aspect ratio converting circuit.

As shown in FIG. 10, the D-type flip-flop 25 is operative when the switching signal IDo generated by the switching signal generator 29 is at "High" level. The D-type flip-flop 26 is operative when a switching signal IDe (phase-shifted by $\pi$ with respect to the switching signal IDo) is at "High" level. Thus, when the switching signal IDo is at "High" level, the luminance data VFY of odd lines are read from the FIFO memory units 5a, 5b. And when the switching signal IDe is at "High" level, the luminance data VFY of even lines are read from the FIFO memory units 5c, 5d.

In this case, the above-described clock generating circuit 24 carries out a phase pull-in operation by the Phase Locked Loop (PLL) using the clock signal CK1D delivered from the clock generating circuit 20 such that rising edges of the clock signals CK1 and CK3 become in correspondence with each other at the boundary between the read period of odd line and even line, (immediately before the timing at which state transition takes place in the switching signals IDo, IDe generated by the switching signal generator 29). Thus, the number of samples of luminance data VFY during the read period of odd line and even line can be controlled.

The D-type flip-flop 25 latches, on the basis of the read clock signal RCK2, the luminance data VFY of odd lines which have been retrieved from the FIFO memory units 5a, 5b at the read period of odd lines during which the switching signal IDo is at "High" level. Moreover, the D-type flip-flop 26 latches, on the basis of the clock signal RCK2, the luminance data VFY of even lines which have been obtained from the FIFO memory units 5c, 5d at the read period of even lines during which the switching signal IDe is at "High" level.

As stated above, the D-type flip-flops 25, 26 perform the role similar to the switch, wherein when the switching signal IDo is at "High" level, the luminance data of odd lines are output through the D-type flip-flop 25, and when the switching signal IDe is at "High" level, the luminance data VFY of even lines are output through the D-type flip-flop 26. Accordingly, when the FIFO memory unit 5a outputs the luminance data VFY through the D-type flip-flop 25, the D-type flip-flop 26 eliminates the influence of the output capacitance of the FIFO memory units 5c, 5d, whereby the satisfactory luminance data VFY is obtained.

As shown in FIG. 9, the FIFO memory units 5a, 5b are connected to the FIFO memory units 5c, 5d through the D-type flip-flops 25, 26, whereby the luminance data VFY of odd lines are retrieved without being affected by the output capacitance from the FIFO memory units 5c, 5d. Moreover, similar with respect to the FIFO memory units 5c, 5d, the luminance data VFY of even lines are obtained from the memory and output without any harmful effects of the output capacitance from the FIFO memory units 5a, 5b.

Further in accordance with FIG. 9, in the aspect ratio converting circuit 5A of such a configuration, since outputs of the FIFO memory units 5a, 5b and outputs of the FIFO memory units 5c, 5d are separated by the D-type flip-flops 25, 26, it is sufficient (without the necessity of switching the output enable signal OE2 with respect to odd and even lines) to supply the output enable signal OExo of a preselected phase (corresponding to the odd samples) to the FIFO memory units 5a, 5c, and to supply the output enable signal OExe of another preselected phase (corresponding to the even samples) to the FIFO memory units 5b, 5d.

Yet another embodiment of the aspect ratio converting circuit according to this invention will now be described. Since the same reference numerals are assigned to the same components as in the above-described embodiments, the detailed explanation of those components previously described will be omitted. Also, the explanation will be given, by way of example, of the aspect ratio converting circuit 5.

Figure 11:
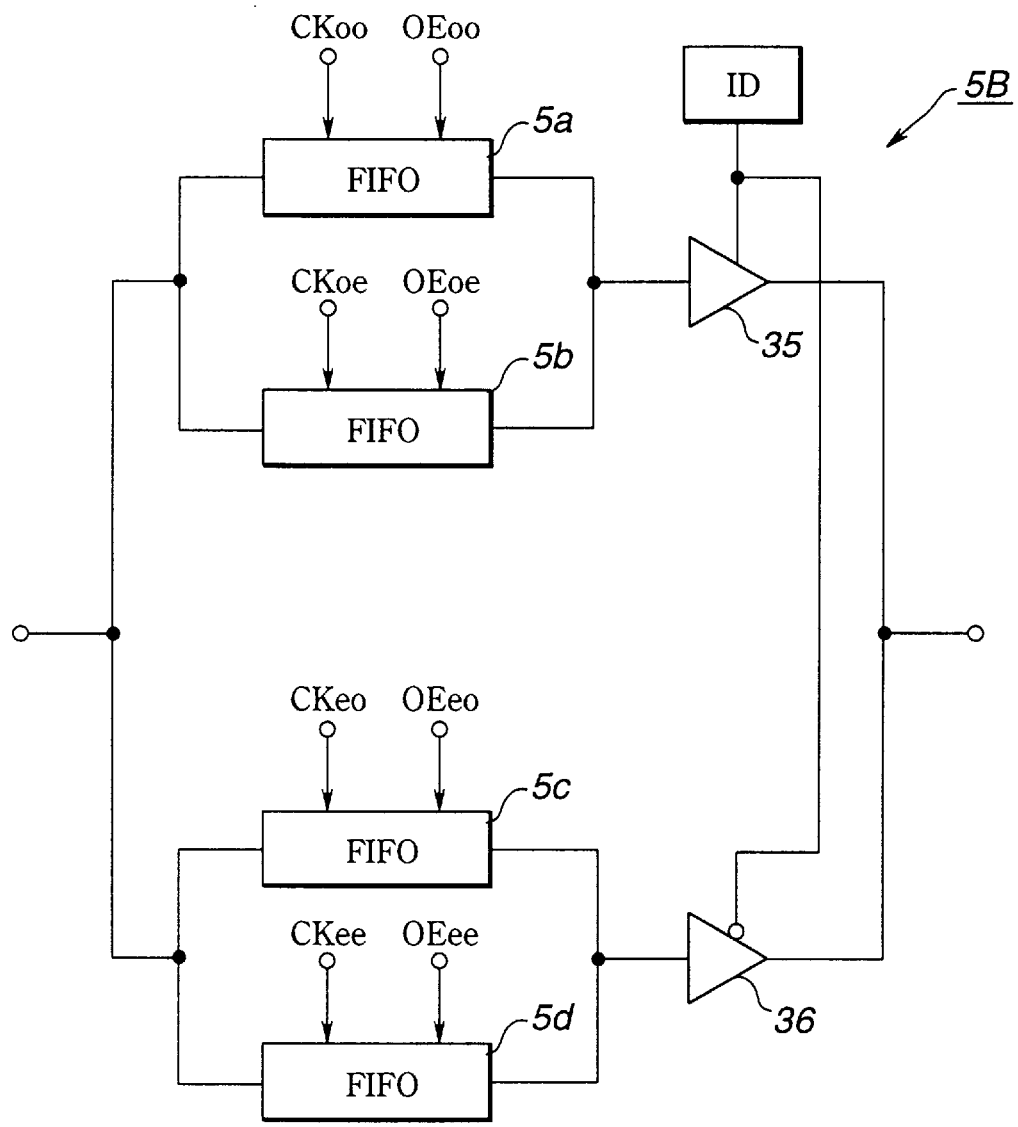
FIG. 11 is a block diagram of the aspect ratio converting circuit according to yet another embodiment of the present invention.

An aspect ratio converting circuit 5B shown in FIG. 11 includes FIFO memory units 5a, 5b in which the input and the output are connected in parallel; a buffer circuit 35 connected to the output of the FIFO memory units 5a, 5b; FIFO memory units 5c, 5d in which the input and the output are connected in parallel; and a buffer circuit 36 connected to the output of the FIFO memory units 5c, 5d.

The buffer circuits 35, 36 are adapted so that their operations are reciprocally switched by the switching signal ID during the aspect ratio conversion. At the read period of odd lines, the switching signal ID of "High" level is set so that the buffer circuit 35 is placed in an operative state while the buffer circuit 36 is placed in an inoperative state. During the read period of even lines, the switching signal ID of "Low" level causes the buffer circuit 35 to be placed in the inoperative state and the buffer circuit 36 is placed in the operative state. The output of the buffer circuits 35, 36 in the inoperative state is in the high impedance state.

In the aspect ratio converting circuit 5B shown in FIG. 11, the buffer circuits 35, 36 perform a role similar to the switches. Namely, for the read period of odd lines during which the switching signal ID is at "High" level, the odd-line luminance data VFY which have been read from the FIFO memory units 5a, 5b are outputted through the buffer circuit 35. Conversely, for the read period of even lines during which the switching signal ID is at "Low" level, the even-line luminance data VFY retrieved from the FIFO memory units 5c, 5d are outputted through the buffer circuit 36.

As stated above, the FIFO memory units 5a, 5b and the FIFO memory units 5c, 5d are connected through the buffer circuits 35, 36, thereby making it possible to carry out the read-out operation of the odd-line luminance data from the FIFO memory units 5a, 5b without the influence of the load capacitance of the FIFO memory units 5c, 5d. In a manner similar to the above, the even-line luminance data can be obtained without being affected by the load capacitance produced by the FIFO memory units 5a, 5b.

The case where the aspect ratio conversion of a picture signal of the main line system and the aspect ratio conversion of a picture signal of the VF system are independently controlled will be explained next. It is to be noted that while the aspect ratio converting circuits 11, 12, 13 respectively carry out the aspect ratio conversion for the main line system, the explanation will be given, by way of example, of the aspect ratio converting circuit 11. It is understood of course that the operations of these circuits are the same.

Figure 12:
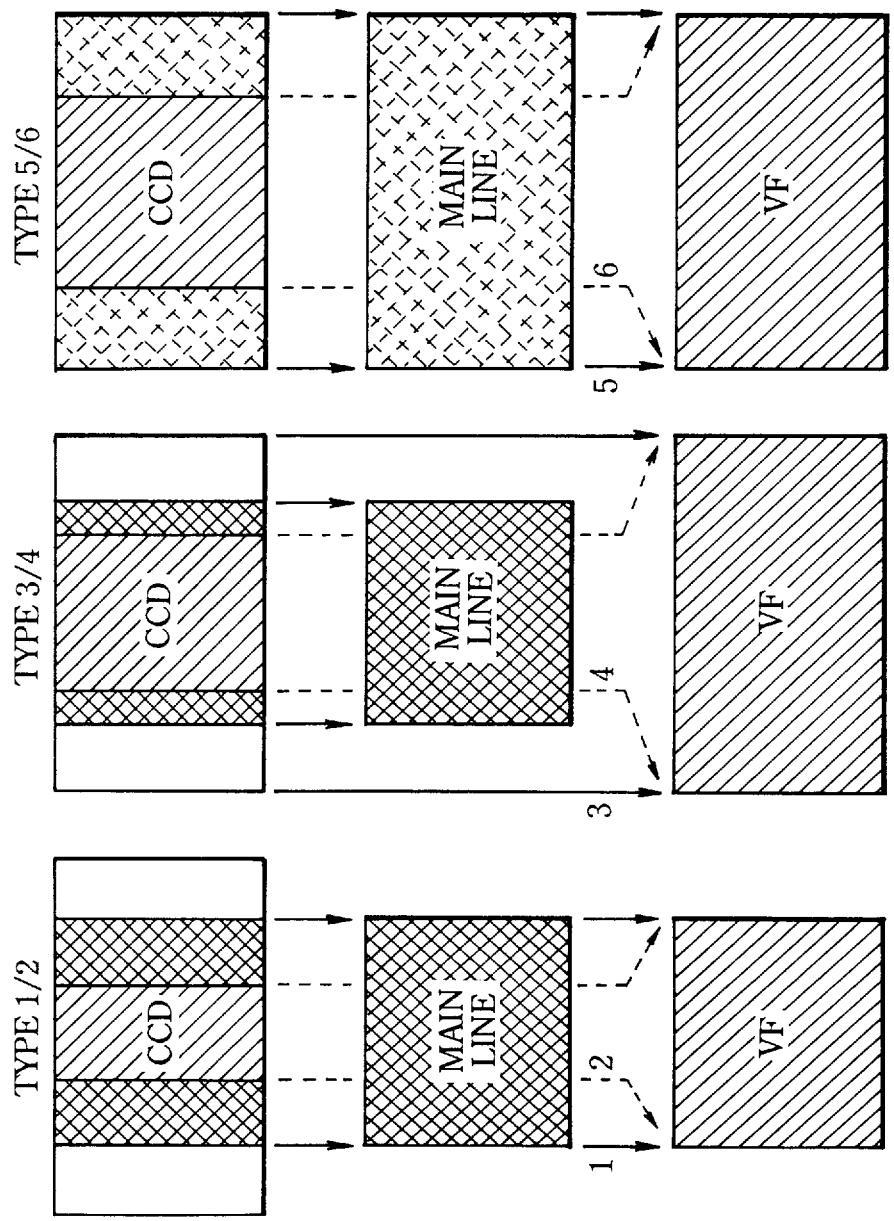
FIG. 12 is a block diagram showing a relationship between an image pick-up picture delivered to a view finder and an output display picture in various operation modes of the video camera according to the present invention.

There are 6 operation modes (type 1 to 6) as shown in FIG. 12. As an example, a representative number of effective pixels in the CCD image sensors 1R, 1G, 1B is 500,000; the aspect ratio is 16:9; and the CCD image sensors 1R, 1G, 1B are adapted to output an image pick-up signal of 1144 samples for the 1H period. Namely, the CCD image sensors 1R, 1G, 1B output the image pick-up signal having the aspect ratio of 16:9.

Clock signal used as the write clock signals WCK1, WCK2 and read clock signals RCK1, RCK2 in the respective operation modes of the type 1 through 6 are shown in Table 1. In the Table 1, CK1" indicates the two-phase clock signals CK1, CK1'; CK3" indicates the two-phase clock signals CK3, CK3'; and CK1H* means the four-phase clock signals CK1H1–CK1H4.

TABLE 1

|  | TYPE 1 | TYPE 2 | TYPE 3 | TYPE 4 | TYPE 4' | TYPE 5 | TYPE 6 |
| --- | --- | --- | --- | --- | --- | --- | --- |
| WCK1 (MAIN LINE) | CK1" | CK1" | CK1" | CK1" | CK1" | CK1H* | CK1H* |
| WCK2 (VF) | CK1" | CK1" | CK1H* | CK1" | CK1" | CK1H* | CK1" |
| RCK1 (MAIN LINE) | CK3" | CK3" | CK3" | CK3" | CK3" | CK1H* | CK1H* |
| RCK2 (VF) | CK3" | CK3H1 | CK1H* | CK1H1 | CK3H1 | CK1H* | CK1H1 |

Further, the number of extraction samples (E) and the number of samples (L) which defines the extraction start position in the operation modes of type 1 through 6 are shown in Table 2.

TABLE 2A

| NO. OF CCD EFFECTIVE PIXELS | TYPE 1 | | TYPE 2 | |
| --- | --- | --- | --- | --- |
|  | MAIN LINE | VF | MAIN LINE | VF |
| 500000 | | | | |
| NO. OF EXTRACTION SAMPLES E | 858 | 858 | 858 | 429 |
| NO. OF SAMPLES L DEFINING | 1022 | 1022 | 1022 | 837 |

TABLE 2A-continued

| NO. OF CCD EFFECTIVE PIXELS | TYPE 1 | | TYPE 2 | |
| --- | --- | --- | --- | --- |
| 500000 | MAIN LINE | VF | MAIN LINE | VF |
| THE EXTRACTION START POSITION | | | | |
| NO. OF SAMPLES N OF 1H | | 1144 | | |

TABLE 2B

| NO. OF CCD EFFECTIVE PIXELS | TYPE 3 | | TYPE 4 | |
| --- | --- | --- | --- | --- |
| 500000 | MAIN LINE | VF | MAIN LINE | VF |
| NO. OF EXTRACTION SAMPLES E | 858 | 1144 | 858 | 572 |
| NO. OF SAMPLES L DEFINING THE EXTRACTION START POSITION | 1022 | 1144 | 1022 | 899 |
| NO. OF SAMPLES N OF 1H | | 1144 | | |

TABLE 2C

| NO. OF CCD EFFECTIVE PIXELS | TYPE 5 | | TYPE 6 | |
| --- | --- | --- | --- | --- |
| 500000 | MAIN LINE | VF | MAIN LINE | VF |
| NO. OF EXTRACTION SAMPLES E | 1144 | 1144 | 1144 | 572 |
| NO. OF SAMPLES L DEFINING THE EXTRACTION START POSITION | 1144 | 1144 | 1144 | 899 |
| NO. OF SAMPLES N OF 1H | | 1144 | | |

The type 1 operation mode will be described next. When the operation section 18 is operated by a user, for example, so that the operation mode of the type 1 is selected, the microcomputer 19 controls the selector 23 to select clock signal CK1" as the write clock signals WCK1, WCK2 of the aspect ratio converting circuit 5 and the aspect ratio converting circuit 11, and to select clock signal CK3" as the read clock signals RCK1, RCK2, as shown in Table 1. Thus, at the aspect ratio converting circuit 5, in accordance with the write clock signal WCK2 (CK1"), the odd-line luminance data VFY is written into the FIFO memory units 5a, 5b, and the even-line luminance data VFY is written into the FIFO memory units 5c, 5d. In addition, at the aspect ratio converting circuit 11, based on the write clock signal WCK1 (CK1"), the odd-line luminance data Y is written into the FIFO memory units 11a, 11b, and the even-line luminance data VFY is written into the FIFO memory units 11c, 11d.

The microcomputer 19 supplies, to the aspect ratio converting circuits 5, 11, the extraction signals C1, C2 corresponding to the write clock signals WCK1(CK1"), WCK2 (CK1") and the read clock signals RCK1(CK3"), RCK2 (CK3"). In the operation mode of type 1, the extraction signals C1, C2 provide extraction start address as N-L= 1144-1022=122 on the basis of the number of samples L (1022) which define the extraction start position from the end of the total number of samples N(1144) of the 1H period, as shown in Table 2.

Thus, at the aspect ratio converting circuit 5, the luminance data VFY up to the 122nd sample (as designated by the extraction start address 122 provided by the extraction signal C2) are not read out, and in accordance with the read clock RCK2(CK3") the odd-line luminance data VFY of the 123rd sample and samples succeeding thereto are read from the FIFO memory units 5a, 5b; while the even-line luminance data VFY of the 123rd sample and samples succeeding thereto are read from the FIFO memory units 5c, 5d.

Accordingly, the aspect ratio converting circuit 5 extracts the luminance data VFY of 858 samples in the central portion of the picture area from the luminance data VFY of 1144 samples every 1H period, whereby the number of samples of the luminance data VFY of one line is reduced by ¾. As a result, the aspect ratio converting circuit 5 can extract a picture of the aspect ratio 4:3 (12:9) from a picture of the aspect ratio 16:9 of the VF system, as shown in FIG. 12. The aspect ratio converting circuit 5 outputs the luminance data VFY of the aspect ratio 4:3 to the view finder 7 through the D/A converter 6.

Similarly, the aspect ratio converting circuit 11 also reduces by ¾ the number of samples of the luminance data Y for one line. As shown in FIG. 12, the picture of the aspect ratio 4:3 can be extracted from the picture of the aspect ratio 16:9 of the main line system. The aspect ratio converting circuit 11 outputs this luminance data Y of the aspect ratio 4:3 to the encoder 10 through the D/A converter 9.

As described above, in the operation mode of type 1, picture data is output to the encoder 10 and the view finder 7, wherein the number of samples for one line is the same in each system. Accordingly, the user can confirm the output picture using the picture of the image pick-up output by the view finder 7.

The operation mode of type 2 will now be described. When the operation section 18 is operated so that the operation mode of type 2 is selected, the microcomputer 19 controls the selector 23 so as to select the clock signal CK1" as the write clock signal WCK2 of the aspect ratio converting circuit 5 and the clock signal CK3H1 as the read clock signal RCK2 thereof, and to select the clock signal CK1" as the write clock signal WCK1 of the aspect ratio converting circuit 11 and the clock signal CK3 as the read clock signal RCK1, as shown in Table 1. Thus, at the aspect ratio converting circuit 5, in accordance with the write clock signal WCK2(CK1"), the odd-line luminance data VFY are written into the FIFO memory units 5a, 5b, and the even-line luminance data VFY are written into the FIFO memory units 5c, 5d. In addition, at the aspect ratio converting circuit 11, based on the write clock signal WCK1(CK1"), the odd-line luminance data Y are written into the FIFO memory units 11a, 11b, and the even-line luminance data Y are written into the FIFO memory units 11c, 11d.

The microcomputer 19 outputs the extraction signals C1, C2 (corresponding to the write clock signals WCK1, WCK2) and the read clock signals RCK1, RCK2 to the aspect ratio converting circuit 5 and the aspect ratio converting circuit 11. In the operation mode of type 2, the extraction signal C1 of the main line system provides the extraction start address as N−L=1144−1022=122 on the basis of the number of samples L(1022) defining the extraction start position from the end of the total number of samples N(1144) for the 1H period. Further, the extraction signal C2 of the VF system provides the extraction start address as N−L=1144−837=307 on the basis of the number of samples L (837).

Thus, at the aspect ratio converting circuit 5, the luminance data VFY up to the 307-th sample (designated by the extraction start address 307 indicated by the extraction signal C2) are not read out, and in accordance with the read clock signal RCK2 (CK1H), the luminance data VFY of the 308-th sample and samples succeeding thereto of odd lines are retrieved from the FIFO memory units 5a, 5b; and the luminance data VFY of the 307-th sample and samples succeeding thereto of even lines are retrieved from the FIFO memory units 5c, 5d. Moreover, at the aspect ratio converting circuit 11, the luminance data VFY up to the 122nd sample (designated by the extraction start address 307 indicated by the extraction signal C2) are not read out, and based on the read clock signal RCK1(CK3"), the luminance data Y of the 123rd sample and samples succeeding thereto of odd lines are output from the FIFO memory units 11a, 11b; while the luminance data Y of the 122nd sample and samples succeeding thereto of even lines are output from the FIFO memory units 11c, 11d.

Accordingly, the aspect ratio converting circuit 5 extracts the luminance data VFY of 429 samples at the central portion of the effective picture area from the luminance data VFY of 1144samples every 1H period to reduce the number of samples of luminance data in one line by ⅜. As shown in FIG. 12, the aspect ratio converting circuit 5 extracts the picture of the aspect ratio 2:3 (6:9) from the picture of the aspect ratio 16:9 of the VF system to enlarge the extracted picture in a horizontal direction so that the aspect ratio of 4:3 is obtained. Namely, the aspect ratio converting circuit 5 reduces the number of samples of the luminance data VFY by ⅜ to enlarge such a picture in the horizontal direction so that the resulting picture is doubled in size. The aspect ratio conversion of 4:3 is thereby provided. Then, the aspect ratio converting circuit 5 delivers the luminance data VFY (having the converted aspect ratio) to the view finder 7 through the D/A converter 6.

The aspect ratio converting circuit 11 extracts the luminance data Y of 858 samples from the luminance data Y of 1144 samples every 1H period to reduce the number of samples of the luminance data Y in one line by ¾. As a result, the aspect ratio converting circuit 11 can extract a picture with the aspect ratio of 4:3 (12:9) from a picture with the aspect ratio of 16:9, as shown in FIG. 12. Then, the aspect ratio converting circuit 11 outputs the luminance data Y having the aspect ratio of 4:3 to the encoder 10 through the D/A converter 9.

Accordingly, in the operation mode of type 2, since the number of samples in one line of the luminance data VFY delivered to the view finder 7 is smaller than the number of samples in one line of the luminance data Y delivered to the encoder 10, the picture (picture image) in which the width of the picture (picture image) of the image pick-up output is enlarged appears at the view finder 7. Thus, since the essential part of the picture of the image pick-up output can be confirmed by the view finder 7 in an enlarged form, the user can easily carry out a manual focus adjustment.

The operation mode of type 3 will now be described. When the operation section 18 is operated to activate the operation mode of type 3, the microcomputer 19 controls the selector 23 so as to select clock signal CK1H* (CK1H1–CK1H4) as the write clock signal WCK2 and the read clock signal RCK2 of the aspect ratio converting circuit 5, and to select clock signal CK1" as the write clock signal WCK1 of the aspect ratio converting circuit 11 and the clock signal CK3" as the read clock signal RCK1, as shown in Table 1.

Accordingly, the clock signal CK1H* (the four clock signals CK1H1–CK1H4) are selected as the write clock signal WCK2 by the selector 23 to correspond to the FIFO memory units 5a–5d. The selected clock signals are supplied to the aspect ratio converting circuit 5. At the aspect ratio converting circuit 5, as shown in FIG. 10, when all of odd and even lines are assumed to be X line, the first sample X1 of the X line is stored in the FIFO memory unit 5a, the second sample X2 is stored in the FIFO memory unit 5b, the third sample X3 is stored in the FIFO memory unit 5c, and the fourth sample X4 is stored in the FIFO memory unit 5d.

At the aspect ratio converting circuit 11, in accordance with the write clock signal WCK1 (CK1"), the odd-line luminance data Y are written into the FIFO memory units 11a, 11b, and the even-line luminance data Y are written into the FIFO memory units 11c, 11d.

The microcomputer 19 outputs the extraction signals C1, C2 corresponding to the write clock signals WCK1, WCK2 and the read clock signals RCK1, RCK2 to the aspect ratio converting circuit 5 and the aspect ratio converting circuit 11. In the operation mode of type 3, the extraction signal C1 of the main line system provides the extraction start address as N−L=1144−1022=122 on the basis of the number of samples L (1022) which defines the extraction start position. The extraction signal C2 of the VF system provides the extraction start address as N−L=1144−1144=0 on the basis of the number of samples L (1144).

When the extraction start address equal to 0 is supplied to the aspect ratio converting circuit 5 by the extraction signal C2, the luminance data VFY of 1144 samples written in the FIFO memory units 5a–5d are read beginning from the first sample every 1H period in accordance with the read clock signal RCK2 (CK1H*). Moreover, the extraction start address of 122 is provided to the aspect ratio converting circuit 11 by the extraction signal C1, whereby, based on the read clock signal RCK1(CK3"), the luminance data Y of the 123rd sample and samples succeeding thereto of odd lines are retrieved from the FIFO memory units 11a, 11b, and the luminance data Y of the 123rd sample and samples succeeding thereto of even lines are obtained from the FIFO memory units 11c, 11d.

Accordingly, the aspect ratio converting circuit 5 extracts the luminance data VFY of all 1144 samples from the luminance data VFY of 1144 samples stored in the FIFO memory units 5a–5d every 1H period to output the luminance data VFY for one line as is. As a result, the aspect ratio converting circuit 5 outputs the luminance data VFY (in which the aspect ratio is 16:9) as is (that is, allowing such luminance data to be passed through) to supply this luminance data VFY to the view finder 7 through the D/A converter 6.

The aspect ratio converting circuit 11 extracts the luminance data Y of 858 samples of the 123rd sample and samples succeeding thereto from the luminance data Y of 1144 samples written in the FIFO memory units 11a, 11b or the FIFO memory units 11c, 11d every 1H period to reduce the number of samples by ¾. The aspect ratio converting circuit 11 can extract a picture having the aspect ratio of 4:3 (12:9) from a picture having the aspect ratio of 16:9 as shown in FIG. 12. Then, the aspect ratio converting circuit 5 outputs a picture signal having the aspect ratio of 4:3 to the encoder 10 through the D/A converter 9.

Accordingly, in the operation mode of type 3, the extracted picture signal in which the aspect ratio is 4:3 is delivered to the encoder 10, and the non-extracted picture signal in which the aspect ratio is 16:9 is delivered to the view finder 7 as is. Thus, the user can confirm, using the view finder 7, the picture in which the range is broader than the picture of the image pick-up output. In other words, it becomes possible to take picture of an object which may fall outside the recording picture area from the movement of the object or the panning of camera, etc., while confirming such a picture using the view finder 7.

The operation mode of type 4 will now be described. When the operation section 18 is operated to select the operation mode of type 4, the microcomputer 19 controls the selector 23 so as to select the clock signal CK1" as the write clock signal WCK2 of the aspect ratio converting circuit 5 and clock signal CK1H1 as the read clock signal RCK2, and to select the clock signal CK1" as the write clock signal WCK1 of the aspect ratio converting circuit 11 and the clock signal CK3" as the read clock signal RCK1, as shown in Table 1. Thus, at the aspect ratio converting circuit 5, in accordance with the write clock signal WCK2(CK1"), the odd-line luminance data VFY are written into the FIFO memory units 5a, 5b, and the luminance data VFY of even lines are written into the FIFO memory units 5c, 5d. Moreover, at the aspect ratio converting circuit 11, based on the write clock signal WCK1(CK1"), the luminance data Y of odd lines are written into the FIFO memory units 11a, 11b, and the luminance data Y of even lines are written into the FIFO memory units 11c, 11d.

The microcomputer 19 sends the extraction signals C1, C2 (corresponding to the write clock signals WCK1, WCK2 and the read clock signals RCK1, RCK2) to the aspect ratio converting circuit 5 and the aspect ratio converting circuit 11. In the operation mode of type 4, the extraction signal C1 of the main line system provides the extraction start address as N-L=1144-1022=122 on the basis of the number of samples L (1022). The extraction signal C2 of the VF system provides the extraction start address as N-L=1144-899=245 on the basis of the number of samples L(899).

Thus, at the aspect ratio converting circuit 5, the extraction start address of 245 is provided by the extraction signal C2, whereby, in accordance with the read clock signal RCK2(CK1H1), the luminance data VFY of the 246-th sample and samples succeeding thereto of odd lines are read from the FIFO memory units 5a, 5b, and the luminance data VFY of the 246-th sample and samples succeeding thereto of even lines are read from the FIFO memory units 5c, 5d. Moreover, at the aspect ratio converting circuit 11, the extraction start address of 122 is supplied by the extraction signal C1, whereby, based on the read clock signal RCK1 (CK3"), the luminance data Y of the 123rd sample and samples succeeding thereto of odd lines are retrieved from the FIFO memory units 11a, 11b, and the luminance data Y of the 123rd sample and samples succeeding thereto of even lines are obtained from the FIFO memory units 11c, 11d.

Accordingly, the aspect ratio converting circuit 5 extracts the luminance data VFY of 572 samples starting with the 246-th sample and samples succeeding thereto from the luminance data VFY of 1144 samples every 1H period to reduce the number of samples of the luminance data VFY in one line by ½. As shown in FIG. 12, the aspect ratio converting circuit 5 extracts a picture having the aspect ratio of 8:9 from a picture having the aspect ratio of 16:9 of the VF system to allow the extracted picture to have the aspect ratio of 16:9 again. Namely, the aspect ratio converting circuit 5 enlarges, in the horizontal direction, the picture in which the number of samples of the luminance data VFY has been reduced by ½ so that the picture, doubled in size, is provided. The aspect ratio converting circuit 5 then outputs the luminance data Y (having the aspect ratio of 16:9) to the view finder 7 through the D/A converter 6.

Moreover, the aspect ratio converting circuit 11 extracts the luminance data Y of 858 samples from the luminance data Y of 1144 samples every 1H period to reduce the number of samples of the luminance data Y in one line by ¾. As a result, the aspect ratio converting circuit 11 can extract a picture having the aspect ratio of 4:3 (12:9) from a picture having the aspect ratio of 16:9, as shown in FIG. 12. Then, the aspect ratio converting circuit 11 outputs the luminance data Y (having the aspect ratio of 4:3) to the encoder 10 through the D/A converter 9.

Accordingly, in the operation mode of type 4, the luminance data Y is extracted so that the aspect ratio of 4:3 is output to the encoder 10; and then the extracted picture signal having the aspect ratio of 8:9 is obtained. Thereafter, the resulting picture is modified to have the aspect ratio of 16:9 due to the enlargement in the horizontal direction. As a result, the picture is doubled in size and as such is supplied to the view finder 7. Since the picture is obtained by enlarging its width, the picture obtained by extracting a portion of the picture in the main line system can be observed by the view finder 7 enabling the user to easily carry out a manual focus adjustment.

It is to be noted that while in the operation mode of type 4 the clock signal CK1H1 having frequency of 9 MHz is selected as the read clock signal RCK2 of the VF system to enlarge the picture so that the picture size doubles in the horizontal direction with respect to the picture of the main line system to display the picture having the aspect ratio of 16:9 by the view finder 7, the clock signal CK3H1 having frequency of 6.75 MHz may be selected as the read clock signal RCK2 of the VF system, as indicated by the type 4' in Table 1.

The operation mode of type 5 will now be described. When the operation section 18 is operated to achieve the operation mode of type 5, the microcomputer 19 controls the selector 23 so as to respectively select the clock signal CK1H* (that is, the 4-phase clock signals CK1H1–CK1H4) as the write clock signals WCK1, WCK2 and the read clock signals RCK1, RCK2 of the aspect ratio converting circuits 5, 11. Thus, at the aspect ratio converting circuit 5, in accordance with the write clock signal RCK2(CK1H*), the luminance data VFY of 1144 samples are written into the FIFO memory units 5a–5d every 1H period. In addition, at the aspect ratio converting circuit 11, based on the write clock signal RCK1(CK1H*), the luminance data Y of 1144 samples are written into the FIFO memory unit 11a–11d every 1H period.

The microcomputer 19 supplies the extraction signals C1, C2 corresponding to the write clock signals WCK1, WCK2 and the read clock signals RCK1, RCK2 to the aspect ratio converting circuits 5, 11. In the operation mode of type 5, the extraction signals C1, C2 of the main line system and the VF system provide the extraction start address as N-L=1144-1144=0 on the basis of the number of samples L(1144)

which defines the extraction start position from the end of the total number of samples N(1144) during the 1H period, as shown in Table 2.

At the aspect ratio converting circuit 5, the luminance data VFY of 1144 samples are retrieved from the FIFO memory units 5a–5d in accordance with the read clock signal RCK2 (CK1H*). Similarly, in the aspect ratio converting circuit 11, the luminance data Y of 1144 samples are fetched from the FIFO memory units 11a–11d based on the read clock signal RCK1(CK1H*).

Accordingly, the aspect ratio converting circuit 5 extracts the luminance data VFY of all 1144 samples from the luminance data VFY of 1144 samples in the 1H period to output the stored luminance data VFY for one line as is. As a result, the aspect ratio converting circuit 5 outputs the luminance data VFY having the aspect ratio of 16:9 as is (that is, such a luminance data is passed through) to output this luminance data VFY to the view finder 7 through the D/A converter 6.

Further, the aspect ratio converting circuit 11 similarly extracts the luminance data Y of all 1144 samples from the luminance data Y of 1144 samples during the 1H period to output luminance data Y having the aspect ratio of 16:9 to the encoder 10 through the D/A converter 9.

Accordingly, in the operation mode of type 5, the luminance data VFY, Y of the aspect ratio 16:9 which have been simply passed through the aspect ratio converting circuits 5, 11 are respectively delivered to the view finder 7 and the encoder 10. Thus, the user can confirm the picture having the same angle of view as that of the image pick-up output by the view finder 7.

The operation mode of type 6 will finally be described. When the operation section 18 is operated to select the operation mode of type 6, the microcomputer 19 controls the selector 23 so as to select the clock signal CK1" as the write clock signal WCK2 of the aspect ratio converting circuit 5 and to select the clock signal CK1H as the read clock signal RCK2, and to the select the clock signal CK1H* as the write clock signal WCK1 of the aspect ratio converting circuit 11 and to select the clock signal CK1H* as the read clock signal RCK1. Thus, at the aspect ratio converting circuit 5, in accordance with the write clock signal WCK2(CK1"), the luminance data VFY of odd lines are written into the FIFO memory units 5a, 5b, and the luminance data VFY of even lines are written into the FIFO memory units 5c, 5d. In addition, at the aspect ratio converting circuit 11, based on the write clock signal RCK1(CK1H*), the luminance data Y of 1144samples are written into the FIFO memory units 11a–11d every 1H period.

Further, the microcomputer 19 generates the extraction signals C1, C2 (corresponding to the write clock signals WCK1(CK1H*), WCK2(CK1") and the read clock signals RCK1(CK1H*), RCK2(CK1H)) for the aspect ratio converting circuit 5 and the aspect ratio converting circuit 11. In the operation mode of type 6, the extraction signal C1 of the main line system provides
the extraction start address as N-L=1144-1144=0 on the basis of the number of samples L(1144) as shown in Table 2. In addition, the extraction signal C2 of the VF system provides the extraction start address as N-L=1144-899=245 on the basis of the number of samples L(899) which defines the extraction start position.

At the aspect ratio converting circuit 5, the extraction start address of 245 is provided by the extraction signal C2, whereby, in accordance with the read clock signal RCK2 (CK1H1), the luminance data VFY of the 246-th sample and samples succeeding thereto of odd lines are retrieved from the FIFO memory units 5a, 5b, and the luminance data VFY of the 246-th sample and samples succeeding thereto of even lines are obtained from the FIFO memory units 5c, 5d. In addition, at the aspect ratio converting circuit 11, the luminance data Y of 1144 samples are output from the FIFO memory units 11a–11d based on the read clock signal RCK1(CK1H*) every 1H period.

Accordingly, the aspect ratio converting circuit 5 extracts the luminance data VFY of 572 samples from the luminance data VFY of 1144 samples every 1H period to reduce the number of samples of the luminance data VFY in one line by ½. As shown in FIG. 12, the aspect ratio converting circuit 5 extracts a picture having the aspect ratio of 8:9 from a picture having the aspect ratio of 16:9 of the VF system to allow the extracted picture to have the aspect ratio of 16:9 for the second time. Namely, the aspect ratio converting circuit 5 enlarges in the horizontal direction the picture in which the number of samples of the luminance data VFY has been reduced by ½ to provide again the aspect ratio of 16:9. Then, this aspect ratio converting circuit 5 outputs the picture signal having the aspect ratio of 16:9 to the view finder 7 through the D/A converter 6.

Moreover, the aspect ratio converting circuit 11 extracts the luminance data Y of all 1144 samples from the luminance data Y of 1144 samples every 1H period to output the luminance data Y having the aspect ratio of 16:9 to the encoder 10 through the D/A converter 9.

Accordingly, in the operation mode of type 6, the luminance data Y having the aspect ratio of 16:9, which has been simply passed through the aspect ratio converting circuit 11, is output to the encoder 10, and a picture signal, which has been extracted to provide a picture with the aspect ratio of 8:9 and undergoing the enlargement of two times in the horizontal direction to have the aspect ratio of 16:9, is supplied to the view finder 7. By enlarging (in the horizontal direction), the picture obtained by extracting a portion of the picture of the main line system, it is possible to easily carry out a manual focus adjustment.

As described above, in the video camera to which this invention is applied, the microcomputer 19 independently controls the aspect ratio converting circuits 5, 11, thereby making it possible to vary the aspect ratio of a picture signal delivered to the main line system and the aspect ratio of a picture signal delivered to the VF system based on user preferences.

In addition, as described above, since the microcomputer 19 can set the extraction start position of picture data based upon the setting of the operation section 18, it is possible not only to extract a picture from the center of the original picture, but also to extract other portions of the picture, such as edges, for example.

Having described specific preferred embodiments of the invention with reference to the accompanying drawings, it is to be understood that the invention is not limited to those precise embodiments. Hence, various changes and modifications may be effected by those skilled in the art without departing from the scope or spirit of the invention as defined in the appended claims.

What is claimed is:

1. A digital signal processing device for processing a video picture, comprising:

memory means having a storage capacity of at least one horizontal line of said video picture for storing a digital signal representing said video picture having a first aspect ratio;

clock generating means for generating a write clock signal and a first read clock signal each having a first data rate, and for generating a second read clock signal having a second data rate related to said first data rate by a preselected conversion ratio between said first aspect ratio and a second aspect ratio; and control means being operative in a first mode to store, at said first data rate, said digital signal in said memory means during a horizontal line period of said write clock signal, and to retrieve, at said first data rate, and following the storage thereof, said digital signal during said horizontal line period such that said digital signal is output at said first data rate from said memory means as said digital signal representing said video picture having said first aspect ratio and being delayed by said horizontal line period;

said control means being further operative in a second mode to store, at said first data rate, said digital signal in said memory means during said horizontal line period, and to retrieve, at said second data rate, a portion of said digital signal during said horizontal line period such that said digital signal is output at said second data rate from said memory means as said digital signal representing said video picture having said second aspect ratio and being delayed by said horizontal line period.

2. The device according to claim 1, wherein said memory means is comprised of first and second memory buffers, said control means being operative in said first mode to control said memory means so as to alternately store a predetermined number of samples of said digital signal in said first and second memory buffers based on said write clock signal, and to alternately retrieve said predetermined number of samples from said first and second memory buffers based on said first read clock signal; said control means being further operative in said second mode to control said memory means so as to store said digital signal representing odd lines of said video picture in said first memory buffer based on said write clock signal and to retrieve said digital signal of said odd lines from said first memory buffer based on said second read clock signal, and to store said digital signal representing even lines of said video picture in said second memory buffer based on said write clock signal and to retrieve said digital signal representing said even lines from said second memory buffer based on said second read clock signal.

3. The device according to claim 2, wherein said first memory buffer is comprised of first and second memory units and said second memory buffer is comprised of third and fourth memory units, said control means being operative in said first mode to control said memory means so as to sequentially store, on a sample-by-sample basis, said digital signal in said first through fourth memory units based on said write clock signal, and to sequentially retrieve, on the sample-by-sample basis, said digital signal from said first through fourth memory units based on said first read clock signal; said control means being further operative in said second mode to control said memory means so as to store said digital signal representing odd samples in odd lines of said video picture in said first memory unit, to store said digital signal representing even samples in said odd lines in said second memory unit, to store said digital signal representing odd samples in even lines of said video picture in said third memory unit, to store said digital signal representing odd samples in said even lines in said fourth memory unit based on said write clock signal, and to retrieve said digital signal from said first through fourth memory units based on said second read clock signal.

4. The device according to claim 3, wherein said clock generating means is operative in said first mode to generate said write clock signal that includes first through fourth sub-write clock signals having respective phases shifted by $\pi/2$ and respective data rates of one fourth of said first data rate, and to generate said first read clock signal that includes first through fourth sub-read clock signals having respective phases shifted by $\pi/2$ and respective data rates of one fourth of said first data rate, and wherein said control means is operative in said first mode to store and retrieve said digital signal to said first memory unit according to said first sub-write and sub-read clock signals respectively, to store and retrieve said digital signal to said second memory unit according to said second sub-write and sub-read clock signals respectively, to store and retrieve said digital signal to said third memory unit according to said third sub-write and sub-read clock signals respectively, and to store and retrieve said digital signal to said fourth memory unit according to said fourth sub-write and sub-read clock signals respectively.

5. The device according to claim 1, wherein said control means is operative in said first mode to control said memory means so as to retrieve said digital signal starting with a first sample of said digital signal stored in said memory means during each respective horizontal line period, said control means being further operative in said second mode to control said memory means so as to retrieve said digital signal starting with a preselected sample of said digital signal stored in said memory means during said each respective horizontal line period independently of said first sample.

6. Imaging apparatus, comprising:

imaging means for generating, at a first rate, a digital signal representing a video picture having a first aspect ratio based on an object image;

memory means having a storage capacity of at least one horizontal line of said video picture for storing said digital signal;

clock generating means for generating a write clock signal and a first read clock signal each having a first data rate, and for generating a second read clock signal having a second data rate related to said first data rate by a preselected conversion ratio between said first aspect ratio and a second aspect ratio; and control means being operative in a first mode to store, at said first data rate, said digital signal in said memory means during a horizontal line period of said write clock signal, and to retrieve, at said first data rate, and following the storage thereof, said digital signal during said horizontal line period such that said digital signal is output at said first data rate from said memory means as said digital signal representing said video picture having said first aspect ratio and being delayed by said horizontal line period;

said control means being further operative in a second mode to store, at said first data rate, said digital signal in said memory means during said horizontal line period, and to retrieve, at said second data rate, a portion of said digital signal during said horizontal line period such that said digital signal is output at said second data rate from said memory means as said digital signal representing said video picture having said second aspect ratio and being delayed by said horizontal line period.

7. The apparatus according to claim 6, wherein said memory means is comprised of first and second memory buffers, said control means being operative in said first mode to control said memory means so as to alternately store a predetermined number of samples of said digital signal in said first and second memory buffers based on said write clock signal, and to alternately retrieve said predetermined number of samples from said first and second memory buffers based on said first read clock signal; said control means being further operative in said second mode to control said memory means so as to store said digital signal representing odd lines of said video picture in said first memory buffer based on said write clock signal and to retrieve said digital signal of said odd lines from said first memory buffer based on said second read clock signal, and to store said digital signal representing even lines of said video picture in said second memory buffer based on said write clock signal and to retrieve said digital signal representing said even lines from said second memory buffer based on said second read clock signal.

8. The apparatus according to claim 7, wherein said first memory buffer is comprised of first and second memory units and said second memory buffer is comprised of third and fourth memory units, said control means being operative in said first mode to control said memory means so as to sequentially store, on a sample-by-sample basis, said digital signal in said first through fourth memory units based on said write clock signal, and to sequentially retrieve, on the sample-by-sample basis, said digital signal from said first through fourth memory units based on said first read clock signal; said control means being further operative in said second mode to control said memory means so as to store said digital signal representing odd samples in odd lines of said video picture in said first memory unit, to store said digital signal representing even samples in said odd lines in said second memory unit, to store said digital signal representing odd samples in even lines of said video picture in said third memory unit, to store said digital signal representing odd samples in said even lines in said fourth memory unit based on said write clock signal, and to retrieve said digital signal from said first through fourth memory units based on said second read clock signal.

9. The apparatus according to claim 8, wherein said clock generating means is operative in said first mode to generate said write clock signal that includes first through fourth sub-write clock signals having respective phases shifted by $\pi/2$ and respective data rates of one fourth of said first data rate, and to generate said first read clock signal that includes first through fourth sub-read clock signals having respective phases shifted by $\pi/2$ and respective data rates of one fourth of said first data rate, and wherein said control means is operative in said first mode to store and retrieve said digital signal to said first memory unit according to said first sub-write and sub-read clock signals respectively, to store and retrieve said digital signal to said second memory unit according to said second sub-write and sub-read clock signals respectively, to store and retrieve said digital signal to said third memory unit according to said third sub-write and sub-read clock signals respectively, and to store and retrieve said digital signal to said fourth memory unit according to said fourth sub-write and sub-read clock signals respectively.

10. The apparatus according to claim 6, wherein said control means is operative in said first mode to control said memory means so as to retrieve said digital signal starting with a first sample of said digital signal stored in said memory means during each respective horizontal line period, said control means being further operative in said second mode to control said memory means so as to retrieve said digital signal starting with a preselected sample of said digital signal stored in said memory means during said each respective horizontal line period independently of said first sample.

11. Imaging apparatus, comprising:
 imaging means for generating a digital signal representing a video picture having a first aspect ratio based on an object image;
 first converting means for providing a predetermined group delay to the generated digital signal and for extracting at least a first portion of samples in a horizontal direction of said video picture defined by said digital signal;
 second converting means for providing said predetermined group delay to the generated digital signal and for extracting at least a second portion of samples in said horizontal direction independently of said first converting means;
 display means connected to said second converting means for displaying said video picture based on said digital signal outputted from said second converting means;
 operation means for setting at least a first and a second operation mode for said first and second converting means; and
 control means for controlling said first and second converting means such that said first converting means extracts less samples from said digital signal than said second converting means when said first operation mode is set by said operation means.

12. Imaging apparatus according to claim 11, wherein in said first operation mode said control means controls said first converting means to extract said first portion of samples such that said first aspect ratio of said video picture is converted to a second aspect ratio, said control means further controlling said second converting means to extract said second portion of samples being equal to said samples in said digital signal in said horizontal direction such that said first aspect ratio of said video picture remains unmodified.

13. Imaging apparatus according to claim 11, wherein in said second operation mode said control means controls said first and second converting means to extract said first and second portions of samples, respectively, such that said first aspect ratio of said video picture is converted to a second aspect ratio.

14. Imaging apparatus, comprising:
 imaging means for generating a digital signal representing a video picture having a first aspect ratio based on an object image;
 first converting means for providing a predetermined group delay to the generated digital signal and for extracting at least a first portion of samples in a horizontal direction of said video picture defined by said digital signal;
 second converting means for providing said predetermined group delay to the generated digital signal and for extracting at least a second portion of samples in said horizontal direction independently of said first converting means;
 display means connected to said second converting means for displaying said video picture based on said digital signal outputted from said second converting means;
 operation means for setting at least two operation modes for said first and second converting means; and
 control means for controlling said first and second converting means such that said first converting means extracts more samples from said digital signal than said second converting means when one of said operation modes is set by said operation means.

15. Imaging apparatus according to claim 14, wherein in said one of said operation modes said control means controls said first converting means to extract said first portion of samples being equal to said samples in said digital signal in said horizontal direction such that said first aspect ratio of said video picture remains unmodified, said control means further controlling said second converting means to extract said second portion of samples such that said first aspect ratio of said video picture is converted to a second aspect ratio.

16. Imaging apparatus, comprising:

imaging means for generating a digital signal representing a video picture having a first aspect ratio based on an object image;

first converting means for providing a predetermined group delay to the generated digital signal and for extracting at least a first portion of samples in a horizontal direction of said video picture defined by said digital signal;

second converting means for providing said predetermined group delay to the generated digital signal and for extracting at least a second portion of samples in said horizontal direction independently of said first converting means;

display means connected to said second converting means for displaying said video picture based on said digital signal outputted from said second converting means;

operation means for setting at least a first and a second operation mode for said first and second converting means; and control means for controlling said first and second converting means based on said first and second operation modes such that said first converting means extracts less samples from said digital signal than said second converting means in said first operation mode, and said first converting means extracts more samples from said digital signal than said second converting means in said second operation mode.

* * * * *